United States Patent
Chen et al.

(10) Patent No.: US 10,409,566 B2
(45) Date of Patent: *Sep. 10, 2019

(54) WEB-BASED SCAN-TASK ENABLED SYSTEM, AND METHOD OF AND APPARATUS FOR DEVELOPING AND DEPLOYING THE SAME ON A CLIENT-SERVER NETWORK

(71) Applicant: METROLOGIC INSTRUMENTS, INC., Blackwood, NJ (US)

(72) Inventors: Enyi Chen, Beijing (CN); Jiangeng Du, Beijing (CN); Weilin Zhang, Beijing (CN); Xiaoxun Zhu, Jinagsu (CN)

(73) Assignee: METROLOGIC INSTRUMENTS, INC., Blackwood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/692,487

(22) Filed: Aug. 31, 2017

(65) Prior Publication Data
US 2018/0004494 A1 Jan. 4, 2018

Related U.S. Application Data

(63) Continuation of application No. 14/370,237, filed as application No. PCT/CN2012/000086 on Jan. 18, 2012, now Pat. No. 9,753,704.

(51) Int. Cl.
*G06F 9/45* (2006.01)
*G06F 8/41* (2018.01)
(Continued)

(52) U.S. Cl.
CPC ............... *G06F 8/41* (2013.01); *G06F 8/10* (2013.01); *G06F 8/20* (2013.01); *G06F 8/315* (2013.01); *G06F 16/9554* (2019.01)

(58) Field of Classification Search
CPC ..... G06F 8/41; G06F 8/10; G06F 8/20; G06F 8/315; G06F 16/9554
(Continued)

(56) References Cited

U.S. PATENT DOCUMENTS 6,550,057 B1 * 4/2003 Bowman-Amuah ... H04L 67/42
717/126
7,047,318 B1 5/2006 Svedloff
(Continued)

FOREIGN PATENT DOCUMENTS

CN 1744498 A 3/2006
WO 2013106947 A 7/2013

OTHER PUBLICATIONS

Title: SAGE-LITE: An Intelligent Light-Weight Multi-agent System; author: Farooq et al, source: IEEE dated: 2006.*
(Continued)

*Primary Examiner* — Chameli Das
(74) *Attorney, Agent, or Firm* — Additon, Higgins & Pendleton, P.A.

(57) ABSTRACT

An improved development and deployment environment and processes for developing and deploying object-oriented web-based scan-task enabled applications, wherein web-based scan-task enabled client computers use scan task specifications and task decoders to retrieve and decode a scan tasks encapsulated on each web page requested and received from a web server supported by an application server and database server, and then perform specified actions, including the display of web controls, required by the scan task script contained within the decoded scan task, corresponding to the served web page.

20 Claims, 24 Drawing Sheets

(51) Int. Cl.
  *G06F 16/955* (2019.01)
  *G06F 8/10* (2018.01)
  *G06F 8/20* (2018.01)
  *G06F 8/30* (2018.01)

(58) Field of Classification Search
  USPC .......................................................... 717/154
  See application file for complete search history.

(56) References Cited

U.S. PATENT DOCUMENTS

| | | |
|---|---|---|
| 7,472,081 B1 | 12/2008 | Cason |
| 7,537,166 B2 | 5/2009 | Anson et al. |
| 9,753,704 B2 | 9/2017 | Chen et al. |
| 2003/0025728 A1 | 2/2003 | Ebbo et al. |
| 2003/0101233 A1 | 5/2003 | Liou et al. |
| 2003/0137522 A1 | 7/2003 | Kaasila et al. |
| 2003/0233581 A1 | 12/2003 | Reshef et al. |
| 2004/0073679 A1 | 4/2004 | Martens et al. |
| 2005/0254086 A1 | 11/2005 | Shouno |
| 2007/0100967 A1* | 5/2007 | Smith ....................... G06F 8/20 709/219 |
| 2007/0284443 A1* | 12/2007 | Anson .................. G06K 7/0008 235/435 |
| 2008/0040240 A1 | 2/2008 | Covington et al. |
| 2008/0228773 A1* | 9/2008 | Stewart ............... G06F 16/9554 |
| 2009/0031236 A1 | 1/2009 | Robertson et al. |
| 2010/0042680 A1 | 2/2010 | Czyzewicz et al. |
| 2010/0131492 A1 | 5/2010 | Nandiraju |
| 2011/0066658 A1* | 3/2011 | Rhoads ................... G06F 3/017 707/803 |
| 2011/0161325 A1 | 6/2011 | Jones et al. |
| 2012/0110174 A1 | 5/2012 | Wootton et al. |
| 2014/0181009 A1* | 6/2014 | Alexander ........ G06F 17/30879 707/609 |
| 2015/0379301 A1* | 12/2015 | Lesavich ............... H04W 12/08 726/28 |

OTHER PUBLICATIONS

Title: Webpage Development for Genome CompressionTechnique, author: Hossein et al, source: IEEE, dated: 2010.*
International Search Report, dated Nov. 1, 2012, for Application No. PCT/CN2012/000086, 2 pages; Previously submitted in parent application.

* cited by examiner

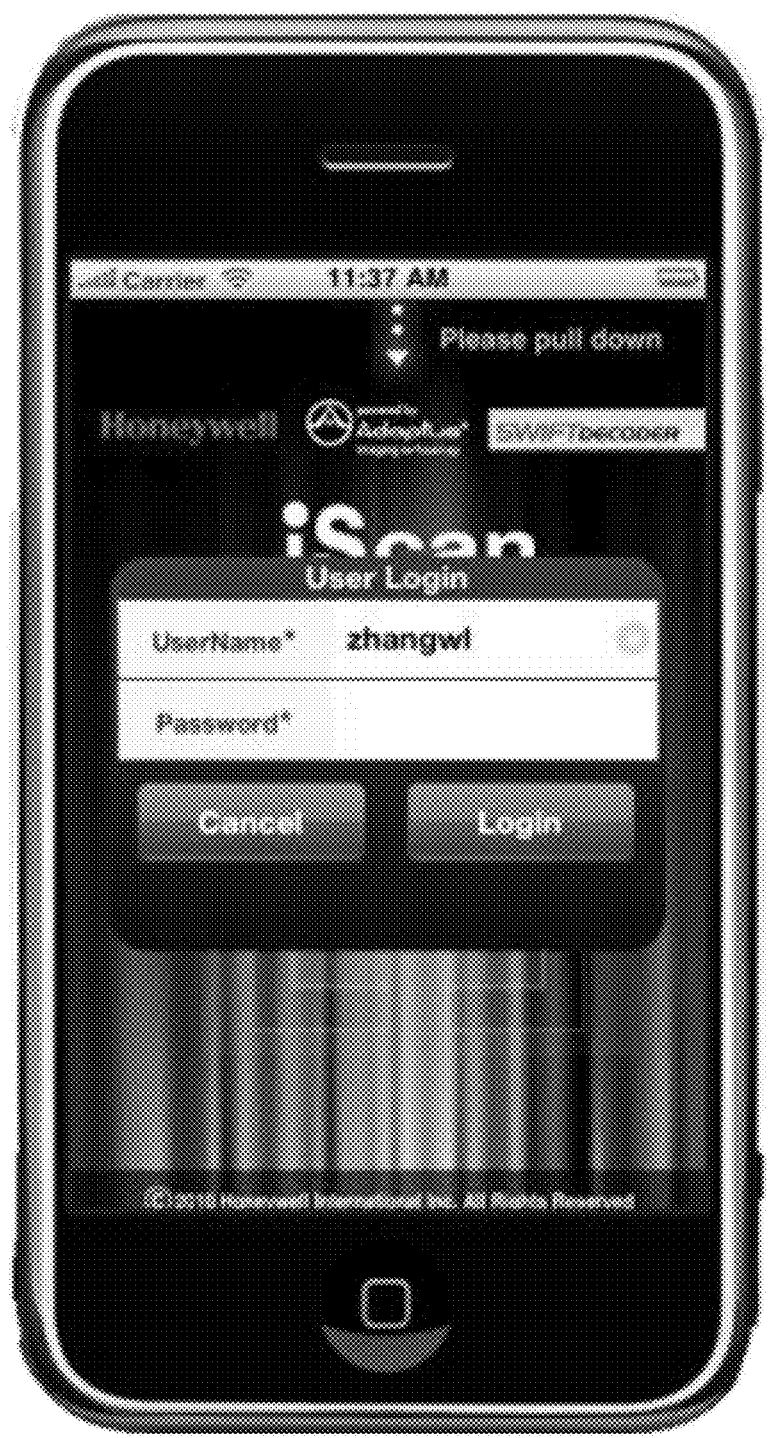
FIG. 1C1

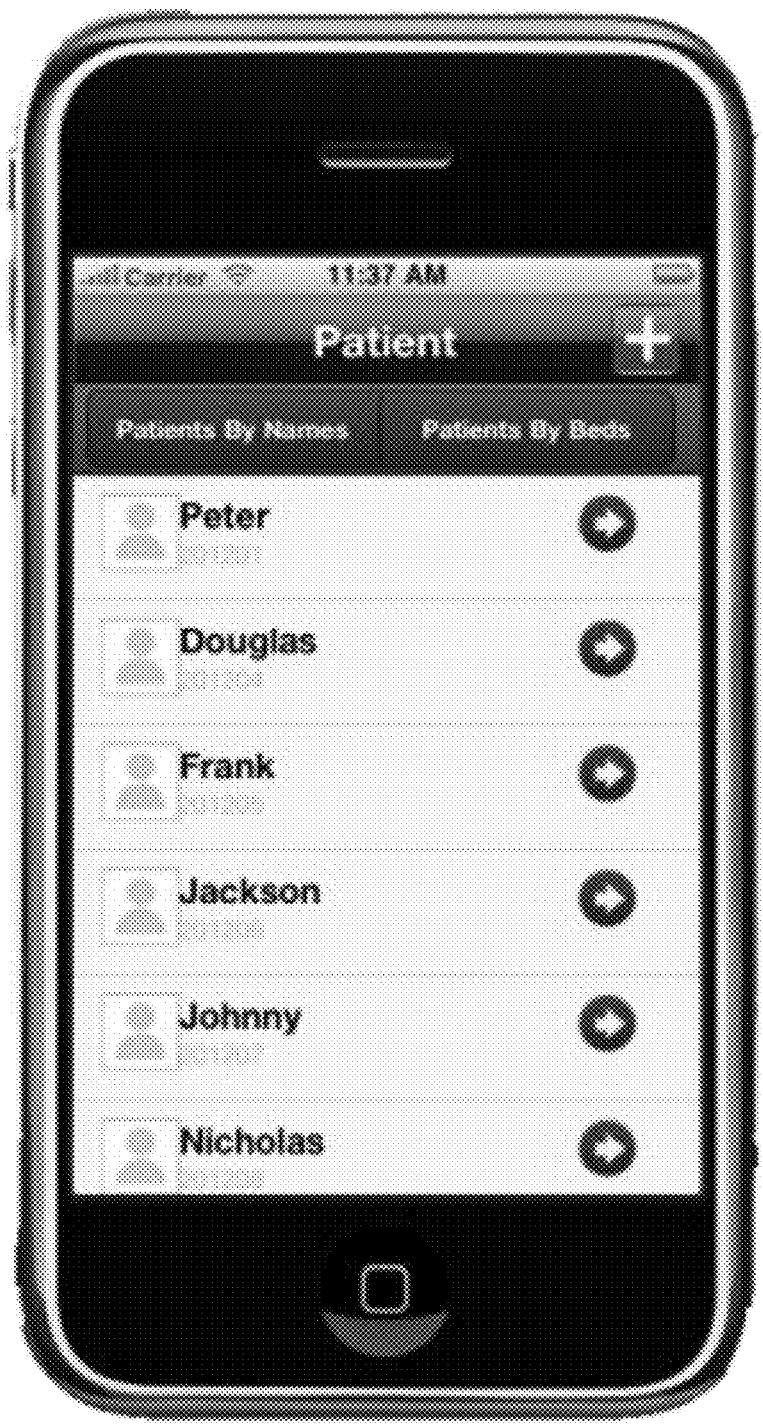
FIG. 1C2

FIG. 1C3

Systems Testing Phase: the implemented web-based system is tested and the developers return to the systems development phase and/or systems design phase, as required to build a system that performs the functions specified and required by use case models developed during the systems analysis phase. Typically, test cases will be created based on created use cases, in a manner known in the art. —D

Systems Deployment Phase: the tested implemented system is deployed on a client-server network having a web server, application server and database server, and wherein each mobile scanning-enabled client machine is equipped with a web browser, a browser container, a task decoder, and a scan driver, and supports the following operations:

(a) the web browser requests a web page from the web server driven by the application server and database server, and scanning inputs;
(b) the browser container retrieves and acquires the scan task encapsulated within the web page;
(c) the web browser receives and displays the web page on the display screen of the client machine;
(d) user invokes the scan driver to scan a barcode symbol and get barcode symbol character data (i.e. scanned ID), e.g. achieved by the user (i) clicking a scan button on the displayed web page to invoke the scan driver to scan a barcode, (ii) clicking a scan button on a web-enabled client application to invoke the scan driver to scan a barcode, or (iii) clicking a hard scan button on the mobile client;
(e) the scan driver returns the scanned ID (i.e. barcode symbol character string) to the Task Decoder (in the browser container);
(f) the task decoder decodes the scan task using the task specification (encapsulated in the webpage) to parse the retrieved web page and decode the scan task, and obtain the scan script contained in the scan task;
(g) the web browser invokes and executes the scan script (e.g. Javascript or VBScript) while using the scanned ID as a parameter;
(h) while executing the scan script, the web browser determines (i.e. finds) the web controls to be displayed in the web page on the client machine, specified by the decoded scan task script, using the scanned ID as a parameter, and associated name rules for updating current web page, and web control ID matching; and
(i) the web browser undertakes the correct action for the displayed web controls.

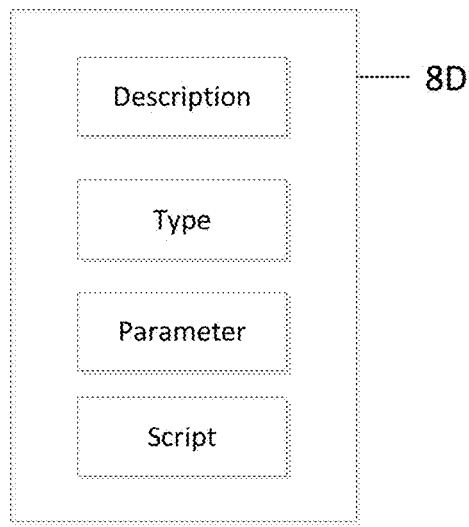 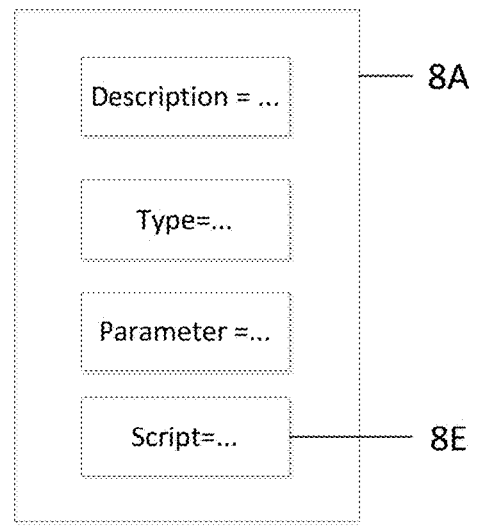
FIG. 3A
FIG. 3B

Framework for scan task preparation

Framework for retrieving and decoding scan task for Method 1(Hidden field)

Framework for retrieving and decoding scan task for Method 2 (Cookie)

Framework for retrieving and decoding scan task for Method 3(Post)

| Control Name | Control ID |
|---|---|
| check box of medicine 1 ID | usedstatus_checkbox_AS001020 |
| check box of medicine 2 ID | usedstatus_checkbox_GA002012 |
| check box of medicine 3 ID | usedstatus_checkbox_SP004021 |
| check box of medicine 4 ID | usedstatus_checkbox_PI004021 |
| check box of medicine 5 ID | usedstatus_checkbox_HI004021 |
| check box of medicine 6 ID | usedstatus_checkbox_QU004021 |
| ... | ... |

FIG. 13

WEB-BASED SCAN-TASK ENABLED SYSTEM, AND METHOD OF AND APPARATUS FOR DEVELOPING AND DEPLOYING THE SAME ON A CLIENT-SERVER NETWORK

CROSS-REFERENCE TO RELATED APPLICATIONS

The present application claims the benefit of U.S. patent application Ser. No. 14/370,237 for a Web-Based Scan-Task Enabled System and Method of and Apparatus for Developing and Deploying the Same on a Client-Server Network filed Oct. 14, 2014 (and published May 7, 2015 as U.S. Patent Publication No. 2015/0128116), now U.S. Pat. No. 9,753,704, which claims the benefit of International Application No. PCT/CN2012/000086 for a Web-Based Scan-Task Enabled System and Method of and Apparatus for Developing and Deploying the Same on a Client-Server Network filed Jan. 18, 2012 (and published Jul. 25, 2013 as WIPO Publication WO 2013/106947). Each of the foregoing patent applications, patent publications, and patent is hereby incorporated by reference in its entirety.

BACKGROUND OF DISCLOSURE

Field of Disclosure

The present disclosure relates to an improved method of and apparatus for developing and deploying mobile Web-based scan task enabled applications, in diverse environments, without the shortcomings and drawbacks of prior art methodologies.

Brief Overview of the State of the Art

Over the past few decades, barcode scanning has become a popular means for acquiring data in diverse fields, including mobile computing applications.

With the commercial availability of mobile phones equipped with integrated cameras, (e.g. Apple® iPhone 4, Blackberry® smartphones, HTC® smartphones, etc), numerous web-based mobile applications have been developed using imaging-based bar code symbol reading methods.

After scanning a bar code symbol and acquiring scanned identification (ID) data, most computer applications process the scanned ID, display its detail information, and store it in database. In applications, only a single task is involved. For example, at the supermarket checkout point, the application only needs to scan all items in the shopping cart and then sum up their price.

However, there is a growing trend to scan different type barcodes for different purposes in a single application. For example, in a mobile nursing system deployed on hospital, a nurse (i) sometimes needs to scan the patient's ID (e.g. barcoded ID bracelet assigned to the patient by hospital administrators) to review the patient's states, (ii) sometimes need to scan medicine ID to check if it is on his prescription with same scanner, and (iii) so on. The application must know how to process its scanned ID to meet user expectations.

In traditional scanner-driven or scanner-supported Web-based applications, involving portable symbol scanning mobile computers and phones, developers must write specific code for each and every scan context, that might take place in a given web-based application. Consequently, during the development phase of such conventional systems, all scan tasks must be hard-coded and binded to a specific event handler function, embedded within each web page generated by JAVA, aspx, php or other code. This programming requirement forces developers to (i) create a scan event handler function for every page, and (ii) define the scan response action in the server's event handler function after scanning a barcode. Consequently, this creates enormous programming work for system developers, and significantly reduces system flexibility. Also, web application developers are currently required to develop different native versions of a mobile multi-scan task web application, for deployment on different platforms (e.g. the Apple iPhone™, Blackberry® Smart Phone™, and Android™ Smart Phone platforms).

However, due to the stateless connection of web based applications, it is difficult to get the "context" for a scanning ID. Thus, a web page does not know how to use a scanned ID (i.e. whether or not to add item to list, update control state, get content from server according to the scanned ID, or navigate to a new page, and so on). Here, "context" means user purpose for the scanning, which determines what to do after the scanning. The context determines how to deal with a scanned ID. In a web based mobile nursing system, for example, the web browser is informed of the page to be displayed now, but it does not know how to deal with a scanned ID for the page.

A number of prior art systems have been proposed for enabling scanning operations in web-based applications.

U.S. Pat. No. 7,537,166 B2 discloses a scanning data device integrated with a web server on it. Any browser connected to this server can set the device's scan parameters or extract data from scan device via network. This system uses formatted URL string as the command to server. Then the server parses the URL string and invokes the corresponding application. The emphasis of this disclosure is how to easily set the scan parameters for the handle device. It does not discuss the concept of scan tasks.

U.S. Pat. No. 7,472,081 discloses a shopping-assistant system using wireless communication. Using this system, shoppers can easily check out product items, view detailed product information, calculate the total price of their cart, etc. The system uses a scanner integrated to a vendor provided device, or cellar mobile phone, to scan a Universal Product Code (UPC) barcode on items in the store or mall. In this Patent, the scan task supported by this mobile device is very single, requires hard coding, and does not support multiple scan tasks.

US Patent Publication No. 2003/0101233 discloses a client-based device which supports only one scan task for scanning formatted barcodes that encode the URL of web sites, and avoid the need typing character strings for the site's web address.

US Patent Publication No. 2008/0040240 discloses a system comprising: a central database stores system data; a web server for serving a web site for customers to design their wish list, containing one or a set of products; and scan device for scanning product codes in mall or store, and uploading the scanned code information to the central database. The design wish list is realized as a web based application, but the scanning device is not a web application, and supports only a single scan task, namely scanning a product item.

Thus, there is a great need in the art to provide an improved method of and apparatus for developing and deploying mobile web-based scan-task enabled applications on a distributed client-server network architecture, while avoiding the shortcomings and drawback of prior art methodologies.

OBJECTS OF PRESENT DISCLOSURE

A primary object of the present disclosure is provide an improved method of and apparatus for developing and deploying mobile web-based scan-task enabled applications, while avoiding the shortcomings and drawback of prior art methodologies.

Another object is to provide a novel method of encapsulating scan tasks in the web pages of a web-based scan-task enabled application.

Another object is to provide a method of designing, developing and deploying web-based applications, or systems, that support diverse types of code scanning (i.e. code reading) so as to facilitate data acquisition as and where needed in any given application, wherein scanned codes can include optical-based bar code symbols, as well as RFID identification tags, as the particular application may require.

Another object is to provide a scan task specification for a web based scanning application.

Another object is to provide a method of writing a write a scan task script (e.g. add item to list, update control state, get content from server according to the scanned ID, or navigate to a new page, and so on) for encapsulation in a web page of a scanning based application.

Another object is to provide a mechanism for associating a scan task with the interface objects of a web page, and ensure that the scan task is transparent to the user so as to not cause a distraction during operation.

Another object is to provide a development environment that allows developers to assign and encapsulate scan tasks within the web pages of a web-based scanner-driven application, or within the application's database server, so that during the deployment phase (i.e. run-time), web-enabled clients automatically decode and execute decoded scan task scripts in response to reading a scanned bar code symbol in any given application environment.

Another object is to provide a method of encapsulating a scan task in a web page by either (i) storing the scan task (script) in a hidden field (i.e. web control), (ii) sending an http request to a server and receiving the http response with the scan task, or (iii) creating a cookie to synchronize the scan task with a web browser supporting cookies.

Another object is to provide a method of automatically associating web controls (e.g. GUI objects) in response to a scanned ID by encoding a web control ID so as to automatically associate the web control to the scanned ID via type matching or ID matching.

Another object is to provide a method of specifying or describing a scan task with a scan task specification.

Another object is to provide a method of encapsulating a scan task on a web page.

Another object is to provide client computer with a decoding engine for decoding a scan task, extracting the scan script in the scan task, and invoking the web browser to execute the scan script, typically a web script, such as JAVAscript.

Another object is to provide an application server with the capacity (i.e. services) for writing data (including scan tasks) into a database server, and reading data from the database server, but does not require a scan task decoding engine.

Another object is to provide a method of associating a scanned ID (i.e. bar code symbol data) with one or more web controls in a web page displayed on a mobile client.

Another object is to provide a method of classifying scenarios in a mobile web-based application, and designing a scan task script for each scenario, so that when users click a code-scanning (i.e. scan) button in the web-based application, the scan task script is automatically executed and the corresponding scripted action to be taken is automatically performed on the scan-task enabled client computer.

Another object is to provide a method of developing web-based multi-task scanning applications, wherein context-sensitive scan-response actions are automatically performed by the Web-based application running on a mobile web-based client computer in response to scanning a code (e.g. bar code symbol or RFID tag).

Another object is to provide an improved web-based application development environment and processes, wherein a task compiler, along with a scan task specification, is used to define and write a scan task for encapsulation into web pages on an application server, or related database server, thereby ensuring that the Web-based application will perform the correct scripted activities in response to a specified scanning event, according to the encapsulated scan task on a web page.

Another object is to provide an improved application deployment/execution environment and processes, wherein web-based scan-task enabled client computers use task specifications and decoding engines to retrieve and decode the scan task encapsulated on each web page requested and received from a web server, and then perform specified actions (including display of web controls) required by the scan task scripted abstracted from the decoded scan task.

Another object is to provide a novel web application development and deployment environment, wherein during the development phase, developers assign and encapsulate scan tasks within the web pages of a web-based application generated by an application server, or within its database server, and then during the deployment phase, web-enabled clients automatically decode and execute scan task script in response to reading a scanned code.

Another object is to provide an improved web-based scan-task enabled application with specific information (i.e. machine-awareness of sorts) as to what action to perform on a particular web page (e.g. scan the bar code symbol or RFID tag on a medicine container, about to be administered to a particular patient so as to display a web page listing all medicines prescribed to the patient by the patient's doctors).

Another object is to provide a "context-aware" web-based scan-task enabled application capable of running on a mobile client computer that posses machine-intelligence knowing how to automatically respond to any particular scanning event by the instructions (i.e. scan response actions) that is embodied within scan tasks encapsulated in web pages where scanning events are performed (i.e. embodied within a particular application context, where the scanning event is to be performed on the web).

Another object is to provide an improved method of web application development that involves designing scan task scripts and using a task compiler to encapsulate corresponding scan tasks within a web (i.e. html) page served from a web server, supported by an application and database server, without changing the code in the web page, thereby allowing each served web page to be requested by the client machine during run-time sessions, its corresponding scan task accessed and decoded, and then its corresponding scan task script accessed and executed by the web browser to perform actions (i.e. including display and updating of web controls) specified by the scan task script.

Further objects of the present disclosure will become more apparently understood hereinafter and in the Claims appended hereto.

BRIEF DESCRIPTION OF THE DRAWINGS

In order to more fully understand the Objects, the following Detailed Description of the Illustrative Embodiments should be read in conjunction with the accompanying Drawings, wherein:

FIG. 1C1 is a graphical representation of a graphical user interface (GUI) displayed on the mobile client machine of FIG. 1B, when a user logs into the client machine;

FIG. 1C2 is a graphical representation of a graphical user interface (GUI) displayed on the mobile client machine of FIG. 1B, when doctor or nurse wishes to list information about a particular patient registered in a hospital;

FIG. 1C3 is a graphical representation of a graphical user interface (GUI) displayed on the mobile client machine of FIG. 1B, when a doctor or nurse wishes to list all medicines that have been prescribed for a particular patient registered in the hospital;

FIGS. 2A and 2B, taken together, show a flow chart illustrating the primary steps involved when carrying out the method of designing, developing and deploying mobile web-based scan task enabled applications according to the principles of the present disclosure;

FIG. 3A is a schematic representation of a scan task specification graphically illustrating the components of any scan task, namely, Type, Description, Parameter and Script;

FIG. 3B is a schematic representation of a concrete scan task (e.g. a programming object) typically implement using JAVA or like programming language, and comprising its implemented components, namely, a specified Type, a specified Description, a specified Parameter and a specified Script;

FIG. 13 is a web control name to web control name table used in the process specified in FIG. 12.

DETAILED DESCRIPTION OF THE ILLUSTRATIVE EMBODIMENTS

Figure 1A:
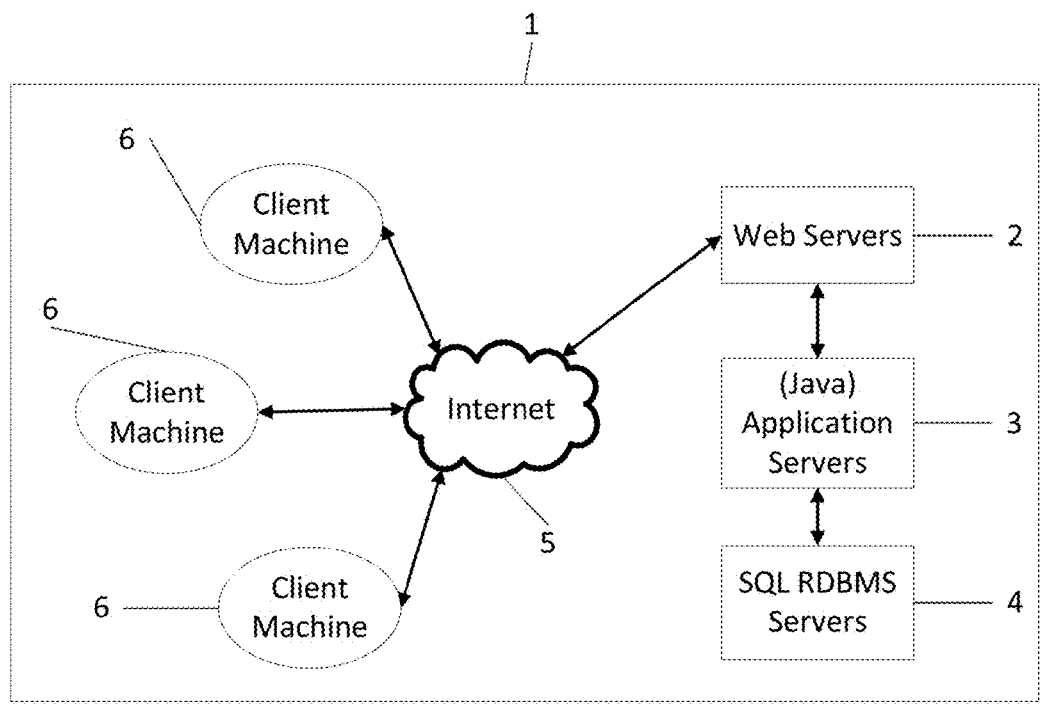
FIG. 1A is a schematic representation of an illustrative embodiment of the mobile scan task enabled Web-based communication and computing system comprising a plurality of a mobile bar code scanning client computers (e.g. Apple® iPhone 4, Blackberry® Smartphone, Google® Android Smartphone, etc), one or more web servers, one or more application servers, and one or more database servers, operably connected by the infrastructure of the Internet.

Referring to the figures in the accompanying Drawings, the illustrative embodiments of the methods and systems of the present disclosure will be described in great detail, wherein like elements will be indicated using like reference numerals.

In general, the web-based mobile scanning enabled communication system of the present disclosure is realized as an industrial-strength Internet-based multi-media communications network of object-oriented system design, deployed on the global data packet information network comprising numerous information subsystems and systems and network components, as shown. As such, the mobile communication network of the present disclosure will be referred to herein as a "system" or "network." As shown in FIG. 1A, a three-tier server architecture with double-firewall security, and a set of wireless scan-task enabled mobile smartphones, will provide a preferred deployment platform on a LAN, WAN and/or the Internet.

Specification of a Client-Server System Architecture on which the Web-Based Scan-Task Enabled Context-Aware Application of the Present Disclosure can be Deployed FIG. 1A shows the possible client-server architecture to implement the web-based context aware scanning system 1. As shown therein, the server side of the deployed web-based mobile scanner-driven mobile computing system/network 1 comprises: a plurality of server-side components, namely: (i) or more (i.e. a cluster of) Web servers 2 operably connected to the infrastructure of the Internet; (ii) one or more (i.e. a cluster of) (JAVA) application servers 3 operably connected to the infrastructure of the Internet; and (iii) one or more SQL database servers 4 operably connected to the infrastructure of the Internet; and a plurality of client-side components, namely web-enabled scanner-driven client computer systems 6.

For purposes of illustration, each web-enabled scanner-driven client computer system 6 can be realized by: (i) any modern mobile code symbol reading smart phone (e.g. an Apple iPhone™, a RIM Blackberry® Smart Phone™, a Google® Powered Android™ Smart Phone, etc); (ii) any Web-enabled optical code scanner driven device (e.g. Apple iPod® Touch Web-enabled portable computer with integrated digital camera 11, Apple iPad 2® Tablet Computer, etc); or (iii) any portable computing system having an integrated bar code symbol reading engine, and/or RFID tag reading engine, in a manner well known in the automatic identification art.

Figure 1B:
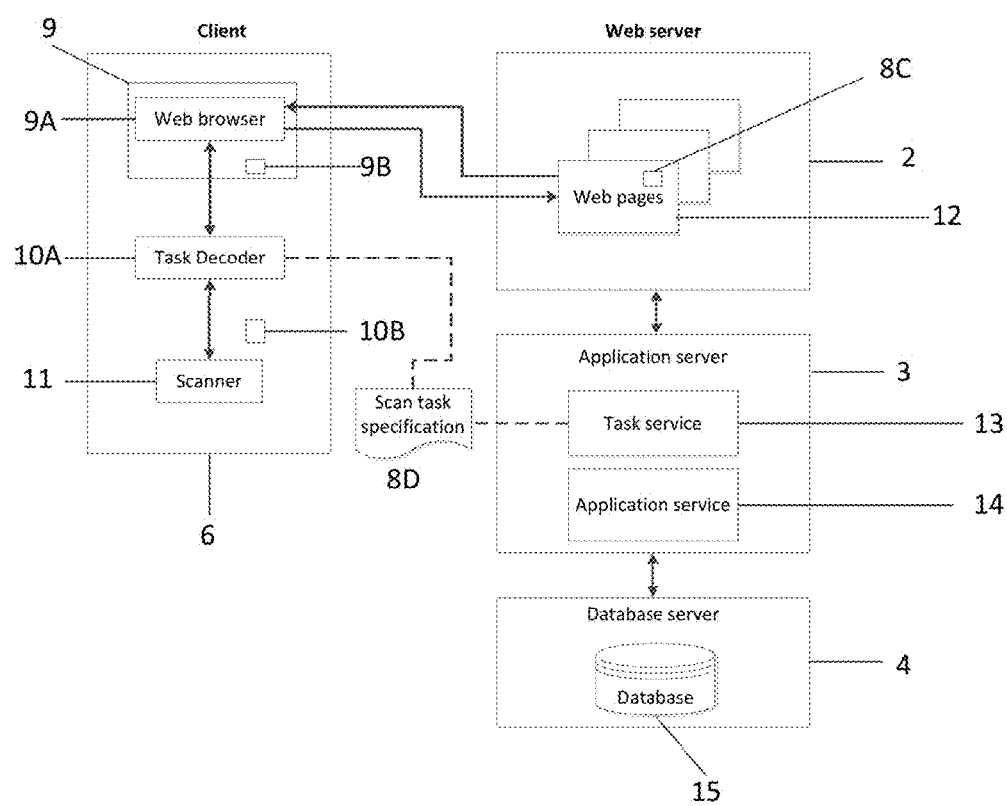
FIG. 1B is a block schematic diagram of web, application and database servers and a client machine deployed in the Web-based communication and computing system illustrated in FIG. 1A.

As shown in FIG. 1B, the Web servers 2 can be realized by any server computer with a hardware platform comprising one or more CPUs, memory architecture, and I/O network interfaces, running an operating system (OS) computer software and at least a web (http) server application (e.g. Apache http server software) and suitable application adapters, in a manner know in the art.

Each application server 3 can be realized by any server-type computer having a hardware platform comprising one or more CPUs, memory architecture, and I/O network interfaces, and running an operating system (OS) and enterprise-level application computer software (i.e. classes and frameworks) implemented using an object-oriented programming language, such as (i) Oracle's JAVA programming language with appropriate JAVA Virtual Machine (JVM) software, along with the J2EE classes and frameworks supported in development environments, or (ii) alternatively, Microsoft's C# programming language supported within Microsoft's .Net integrated development environment (IDE) with appropriate classes and frameworks, and the like.

Each database server 4 can be realized by any server-type computer having a hardware platform comprising one or more CPUs, memory architecture (and sufficient storage using a RAID or like system), and I/O network interfaces, and running an operating system (OS) computer software and a SQL-type database application 15 (e.g. Oracle Database 11g, PostgresSQL object-relational database system, MySQL object-relational database system, etc)

It is understood that servers 2, 3 and 4 will typically be deployed behind a high-security network firewall appliance, and configured together with high-speed IP router and switches (available from CISCO, Inc.) in a manner well known in the computer networking art.

As shown in FIG. 1B, each mobile client system 6 in the web-based mobile scanner-driven computing system/network 11 comprises a hardware platform comprising one or more CPUs, memory architecture, and I/O network interfaces, integrated bar code symbol scanner 11 (e.g. realized as an integrated laser scanning bar code symbol reading module, or as integrated digital imaging based bar code symbol reading device), and/or RFID tag reader/writer (collectively "identification code reader"), and running an operating system (OS) and enterprise-level application computer software (i.e. classes and frameworks) supporting three main software modules supported on the hardware platform. The client software modules include: (i) a browser container (i.e. a native application or implemented as an ActiveX control in the web page) 9 containing an embedded web browser (e.g. any modern browser 9A like Safari, IE, or Firefox etc.) to display web pages; and functional modules, namely: (ii) a task decoder 10A for handling task related works such as requesting task from server, and decoding task according to the scan task specification; and (iii) a scan driver (e.g. library) 10B for driving the scanning hardware, handling the scan request, acquiring the scanned ID (i.e. code data), and returning scanned code data (e.g. scanned ID) to the mobile device. Each mobile client computing system 6 requires access to the infrastructure of the Internet using network protocols and diverse kinds of communication media, including wireless carrier-class data communication networks, well known in the art.

As illustrated in FIGS. 1C1 through 1C3, the mobile client system 6 is shown supporting a mobile web-based scanner-driven nursing system (application) designed for use in a hospital environment. For this web-based system, three different "use cases" are illustrated, namely:

(i) scan a nurse identification barcode to log the nurse into the web-based system and then list the nurse's patients, as shown in FIG. 1C1;

(ii) scan a patient identification barcode to navigate to a new wed page in the application, to display detail information about the patient, and causing navigation from the web page shown in FIG. 1C1 to the web page shown in FIG. 1C2; and (iii) scan a medicine identification barcode to update the state of medicine (i.e. medicine state) in the patient's prescription (i.e. cause a check mark to be inserted into the medicine check box shown the FIG. 1C3 or generating an alarm signaling that the identified medicine is not in the patient's prescription).

Hereinafter reference will be made to this exemplary system (i.e. an exemplary web-based scan-task enabled application) to provide helpful examples of the various illustrative embodiments of the present disclosure set forth herein.

Overview of Web-Based Application Design, Development and Deployment Environment (IDE) of the Present Disclosure In general, the web-based mobile scanning enabled communication system 1 of the present disclosure can be implemented using any object-oriented programming language, preferably using a commercially available integrated design, development and deployment environment (IDE). For example, when using Oracle's JAVA programming language, with appropriate JAVA Virtual Machine (JVM) software, and J2EE classes and frameworks, the system engineer can use a number of commercially available IDE frameworks, namely: Oracle's WebLogic® Integrated Development Environment (IDE) framework; ORACLE.COM/TECHNETWORK/MIDDLEWARE/WEBLOGIC/OVERVIEW/INDEX.HT ML; IBM's WebSphere® Integrated Development Environment (IDE) framework; IBM.COM/DEVELOPERWORKS/DOWNLOADS/WS/WASDEVELOPERS; Apple's WebObjects 5.4 IDE; WIKI.OBJECTSTYLE.ORG/CONFLUENCE/DISPLAY/WO/HOME, Project Wonder Development Environment WIKI.OBJECTSTYLE.ORG/CONFLUENCE/DISPLAY/WONDER/HOME, WOProject/WOLips WIKI.OBJECTSTYLE.ORG/CONFLUENCE/DISPLAY/WOL/HOME; or Adobe System's ColdFusion 9 Enterprise Application Server IDE, ADOBE.COM/PRODUTS/COLDFUSIONFAMILY.HTML.

When using Microsoft's $C^\#$ programming language to implement an object-oriented relational system, the system engineer can use a non-JAVA IDE, such as Microsoft's .Net integrated development environment (IDE) http://www.microsoft.com/net.

Preferably, the system of the present disclosure is designed according to rational object-oriented systems engineering (DOSE) methods using UML-based modeling tools such as ROSE® by IBM, using the industry-standard Rational Unified Process (RUP) or Enterprise Unified Process (EUP), both well known in the art.

In the illustrative embodiment, any SQL database program compatible with the deployed application server can be used to implement this system component. Also, during object-oriented design (00D) and system development, for a JAVA-based system implementation, it is understood that the tables and relationships in the RDBMS, as well as GUI components for the system, will be converted to JAVA class models within the JAVA application server, in a manner well known in the art.

Overview on the Web-Based Scan-Task Enabled Application Development and Deployment Environment of the Present Disclosure In general, the innovative development and deployment methods and apparatus of the present disclosure can be applied to diverse scan task environments. For example, in some instances or contexts, a web-based application will require scanning a patient ID barcode, and then viewing detailed information about the patient. In other instances or contexts, a web-based application will require scanning a medicine identification bar code symbol (i.e. medicine ID code) to indicate a particular medicine that has already taken by a patient. Thus, in addition to supporting the scanning of barcode symbols, the web-based application also performs the prescribed/scripted actions in response thereto (e.g. checking a checkbox or navigating to a new updated web page) intended by the developers of the web-based application.

Also, the major improvements in such web-based application development and deployment tools and methods are practiced over two distinct phases of the object-oriented systems engineering (DOSE) process, namely: the systems (i.e. application) development phase, and the systems (i.e. applications) deployment phase.

Figure 5A:
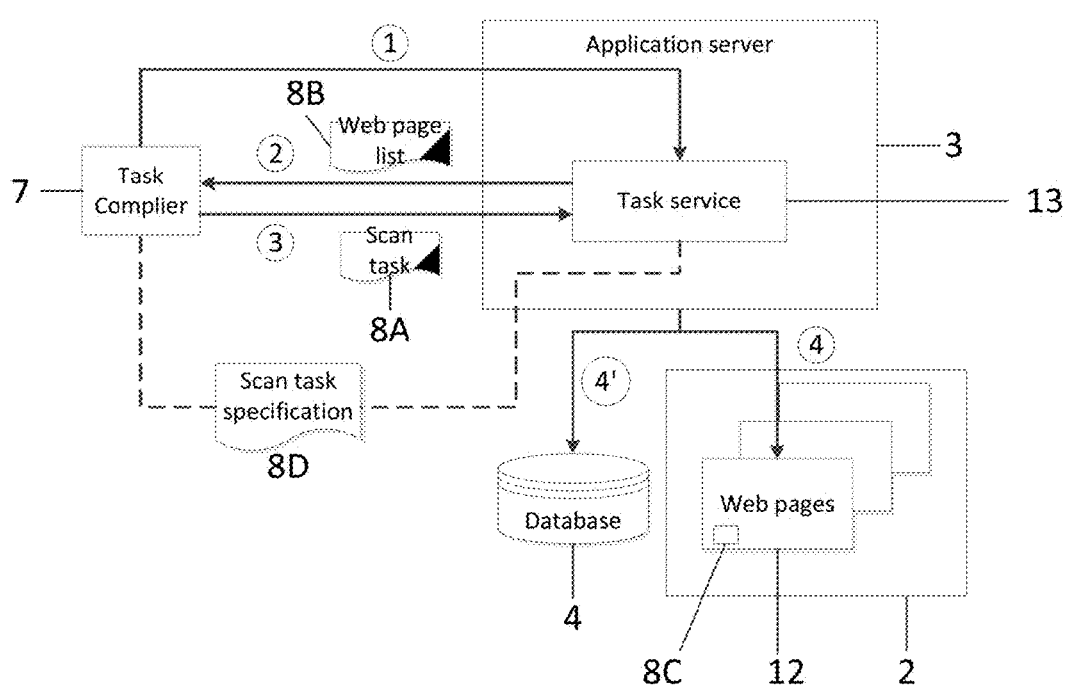
FIG. 5A is a schematic representation illustrating the framework and process for prepare scan tasks on a web-based multi-tier application server, involving the task compiler (i) requesting a web page list from the server, (ii) serving the web page list to the task compiler, and (iii) performing scan task encapsulation on the server side by (a) submitting all possible scan task classes (i.e. JAVA-implemented object) to the task services module on the application server, and (b) writing the scan task string to either (i) into a hidden field of the web page (according to method 1 described in FIGS. 6 and 7), or into the scan task database on the database server (according to encapsulation methods 2 and 3, described in FIGS. 8 and 9, and 10 and 11, respectively)

During the systems development phase of the web-based scan-task enabled system illustrated in FIG. 5A, developers use a task compiler 7 (i.e. a development tool) to define and deploy scan tasks (e.g. JAVA objects) on the server side of the client-server network, e.g. encapsulated into a web (i.e. html) page on a web server, and/or application server, or within an associated database server driving the application and web servers. As an independent development tool for encapsulating scan task into the server side environment, the task compiler can run on any network-enabled computer system having the capacity to properly connect to the application server 3 and the database server 4, and support data packet communications, in a manner well known in the computer networking art.

Notably, the task compiler 7 is not deployed on the client computer, or on the application server 3 or database server 4. In the present disclosure, the task compiler is used as a developer tool, as well as the system maintenance tool after system deployment. During the system development phase, developers use the task compiler 7 to define scan tasks and then write them to (memory storage locations on) the server side of the client-server network (e.g. in a scan task database or encapsulated in a webpage). During the system deployment phase, developers use this tool to easily update scan tasks deployed on a web-based scan-task enabled client-server system/network, instead of changing codes on the application server and then redeploying the application server.

As illustrated in FIG. 5A, the task compiler 7 supports three (3) different services, namely: (i) call a web service from the application server to get all the web pages (i.e. determine the scan scenario). The task compiler tool lists the returned web pages 8B, and then developer can choose a web page from the list to define a scan task for the page; (ii) load a task specification and then parse the scan task specification into programming classes (e.g. JAVA classes) so that the specific scan task can be viewed as a instance of the parsed class; and (iii) write the defined scan task 8A into the application server 3 (or database server 4).

During the deployment phase of the web-based scan-task enabled system, each web-enabled scanner-driven mobile client machine includes a number of important software modules, as indicated above, namely: (i) browser container 9 containing a web browser 9A to display web pages 12; and two functional modules, namely: (ii) task decoder 10A for handling task related works such as requesting the encapsulated scan task from application server, and decoding the retrieved scan task according to the scan task specification to obtain the scan task script; and (iii) scan driver (e.g. library) 10B for driving the code scanning hardware 11 (e.g. bar code symbol reading engine and/or RFID tag reading engine), and handling the scan request and returning the scanned result (e.g. scanned ID) to the mobile computing device 6.

The browser container 9 is a native application in the web-based scan task enabled system and provides the basic user interfaces (UI) on the mobile client. However the browser container can be implemented as an ActiveX control in a web page. It integrates all the modules on the client system, and handles messages from the task decoder 7, scan driver 10B and web browser 9A. In short, the browser container 9 can be viewed as a system user interface for the mobile computing system 6.

A scan driver 10B is a software layer between the code scanning device (e.g. bar code reading engine and/or RFID tag reading engine) and the web-based application running on the mobile client 6. For example, when user clicks a scan button, which may be displayed in a web page displayed on the LCD or e-ink display screen of client system 6, or realized a hardware-implemented button integrated with the client system housing 6, the web-based application will call the scan driver 10B to scan a barcode (or read an RFID tag, as the case may be), and then the scan driver 10B will return the result (i.e. scanned ID) to the task decoder 10A. The scan driver 10B hides the details of a specific scanning device 11, and many different types of scan devices can be used, provided the scan driver 10B for the scanning device 11 is loaded onto the mobile client system 6.

The task decoder 10A is a module used to interpret the task returned from server for the client application. Task decoder is only integrated on the client side, and not the server side. A scan task 8A is successfully understood by the client via the task decoder module 10A. The task decoder 10A contains two (2) components: (i) a first component for loading and parsing the scan task specification, as mentioned above; and (ii) a second component for parsing and interpreting (i.e. task decoding) the scan task according to the scan task specification, residing in the system.

Web controls are the common widgets (e.g. user interface (UI) or interface objects) that are rendered by the web browser 9A and form part of web pages displayed on the display screen of each client computing system 6. Web controls are the basic elements in a web page and each web page is made up of these web controls. Examples of web controls include: a textbox allowing user to input a string; a clickable button; a label used to display static text content; listbox listing checkable items; a checkable checkbox used to indicate status; etc.

A scan button 8C can be located on a webpage, or realized as a hardware button physically provided on the client machine. Alternatively, the scan button can be inserted on the browser container 9 with the web browser 9A integrated with a client application 9B. In response to acquired code scanning data, the Web browser 9A executes the decoded scan task script to display specified web controls, and performs the correct scripted action (e.g. update the web page) according to the decoded scan task script.

Figure 2A:
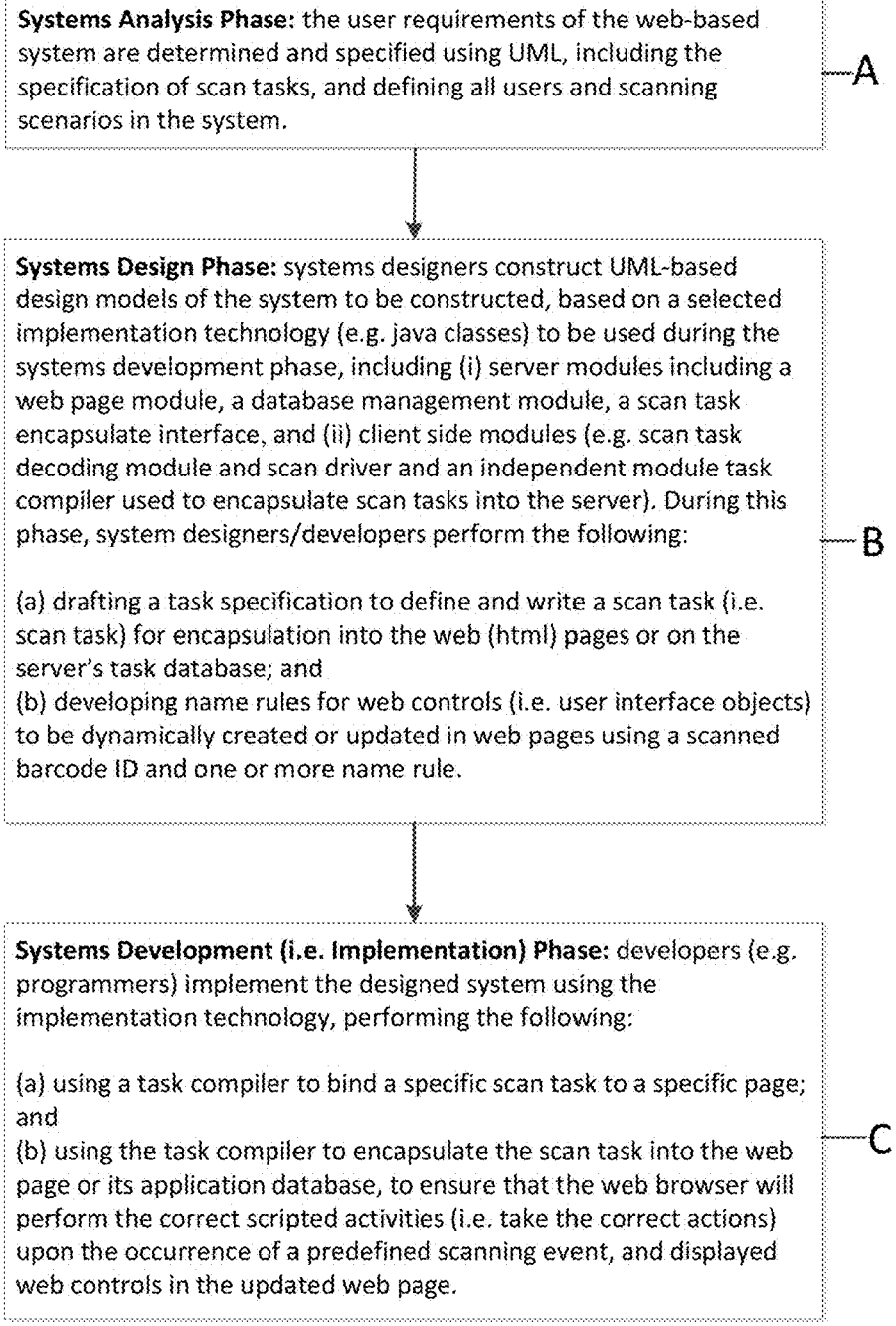

Specification of the Method of Developing and Deploying Web-Based Mobile Scan-Task Enabled Applications Referring to FIGS. 2A and 2B, it is appropriate at this juncture to specify an illustrative embodiment of the method of developing and deploying web-based mobile scan-task enabled applications (i.e. object-oriented systems), deployable on a client-server network architecture, as shown in FIG. 1A. Preferably, the mobile scan task enabled Web application ("system") will be being designed and constructed as a rational object-oriented systems engineering (ROSE) project having the following five conventional phases, such as: systems analysis phase; systems design phase; systems development/implementation phase; systems testing phase; and systems deployment phase. These phases of system engineering will be described in detail below, in a logical sequential order.

During the Systems Analysis Phase

As indicated at Block A in FIG. 2A, during the Systems Analysis Phase, the user requirements of the web-based system are determined and specified using UML, including the specification of scan tasks, and defining all user and scanning scenarios in the system.

During the Systems Design Phase

As indicated at Block B in FIG. 2A, during the Systems Design Phase, systems designers construct UML-based design models of the system to be constructed, based on a selected implementation technology (e.g. JAVA classes) to be used during the systems development phase, including (i) server modules including a web page module, a database management module, a scan task encapsulate interface, and (ii) client side modules (e.g. scan task decoding module and scan driver and an independent module task compiler used to encapsulate scan tasks into the server).

During this systems design phase, system designers/developers perform the following:

(a) drafting a task specification to define and write a scan task (i.e. scan task) for encapsulation into the web (html) pages or on the server's task database; and (b) developing name rules for web controls (i.e. user interface objects) to be dynamically created or updated in web pages using a scanned barcode ID and one or more name rule.

The Relationship Between the Scan Task Specification and the Scan Task

In general, there will be more than one scan task employed in any given web-based scan task enabled application, in accordance with the present disclosure. Thus, it is necessary to formally define each scan task 8A with a scan task specification 8D.

In the object-oriented computer programming art, a class is a programming level concept and it organizes all data fields. A class holds the common features (data fields) and methods of an object.

The programmer defines a scan task according to a scan task specification, and the scan task is abstracted as a class containing all of its data fields (i.e. type, name, description and script) and several methods (e.g. serialize and de-serialize) for the scan task.

A scan task instance can be created according to the class definition. Using the serialize method, a scan task can be serialized as a string which contains all the data of a specific scan task. In contrast, using the de-serializing method, a scan task string is taken as input and parsed into a scan task instance.

Referring to FIGS. 3A and 3B, the relationship between a scan task specification 8D and a scan task 8A is represented. Specifically, as illustrated in FIG. 3A, every "scan task specification" 8D consists of a task type, scan task description, parameters, and a scan task script 8E. In contrast, a illustrated in FIG. 3B, a "scan task" 8A is a specific type of task, realized as a concrete object (implemented in JAVA or C# programming language), in the context of the object-oriented programming environment. Also, a scan task specification 8D represented in FIG. 3A is used to define a scan task, and describe its general properties.

In the present disclosure, each scan task specification 8D is compiled as a class (e.g. JAVA class), and used as a reference, during the development and deployment (run-time) phases, on the client 6, the application server 3, and the task compiler 7. Therefore, the scan task specification 8D is integrated into the application server 3, the task compiler 7, and web-enabled clients 6.

Each scan task can be described or specified below as follows:

```
<ScanTask> ::= [<Description>]<Type><Parameter><Script>
<Description>::= <string>
<Type>::= "scantask1"|"scantask2"|"scantask3"|"scantask4"
<Parameter>::={<param>=<value>}
<Script>::=<string>
<param>::=string
<value>::=string
``` wherein the parameter "Type" differentiates the task from each other; the parameter "Description" provides the summary of the scan task; "Parameter" provides list of string key-value pair related to the task; and "Script" is web script which can be invoked to execute specified actions (e.g., fill one text box or check/uncheck a check box on this page, or navigate to a new page, and so on).

In the above mobile nursing system, the Type parameter in the scan task specification could be selected from the following:

```
<Type>::="AddItem"|"Navigation"|"UpdateState-
"|"Update Content"
```

Figure 3C:
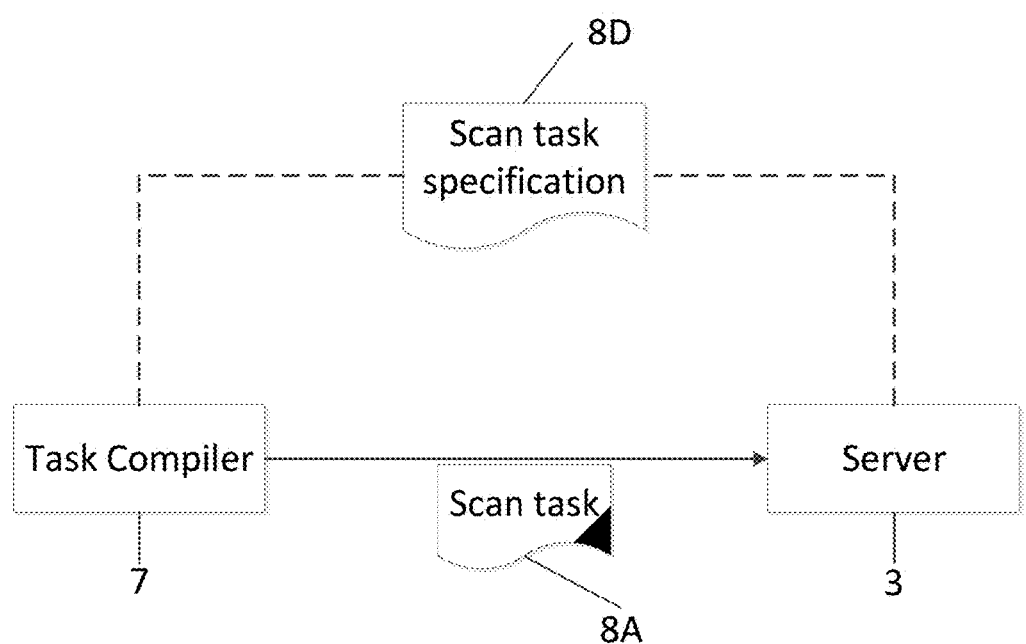
FIG. 3C is a schematic representation showing the relationship among task compiler, the application server and the scan task specification during scan task preparation phase of the system development phase, wherein the server side has been simplified as a single module, the dash lines indicate the task compiler and application server have a reference to the scan task specification, and the scan task specification provides the definition of the (implemented) scan task.

FIG. 3C illustrates the relationship among task compiler, the application server 3 and the scan task specification 8D during the scan task preparation portion of the system development phase. In this schematic, the server side has been simplified as a single module, the dash lines indicate the task compiler and application server 3 have a reference to the scan task specification 8D (i.e. scan task specification resides on both the task compiler 7 and application server 3), and the scan task specification 8D provides the definition of the (implemented) scan task 8A, schematically depicted in FIG. 3B. As will be described in greater detail hereinafter, the task compiler 7 can use the scan task specification to generate and write a scan task 8A into the server side during system development, and also so that the server application can understand the scan task 8A generated by the task compiler 7 using the scan task specification 8D, and then write the scan task into the database or into a web page.

Figure 3D:
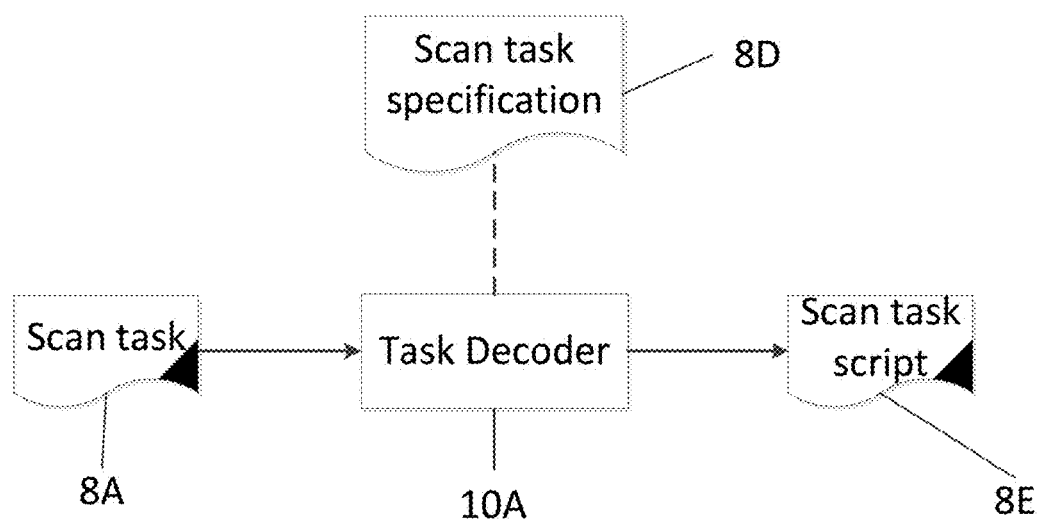
FIG. 3D is a schematic representation showing the relationship among the scan task, the scan task specification, the task decoder and the scan task script during run time phase (i.e. system deployment), wherein the task decoder uses the scan task specification to successfully decode a scan task according to its scan task specification definition, separate it into its component parts (i.e. type, description, parameter and scan task script), and then selects the scan task script from these component parts, for execution by the client web browser.

FIG. 3D illustrates the relationship among the scan task 8A, the scan task specification 8D, the task decoder 10A and the scan task script 8E during run time phase (i.e. system deployment). As will be described in greater detail hereinafter, during the deployment phase, the task decoder 10A uses the scan task specification 8D to successfully decode a scan task 8A according to its scan task specification 8D definition, separate it into its component parts (i.e. type, description, parameter and scan task script), and then selects the scan task script 8E from these component parts, for execution by the client web browser.

A scan task cannot be directly stored in a hidden field of a web page, or in the scan task database on the database server 4. Therefore, a scan task needs to first be serialized into a string. The serialization results in all the data fields (data members) of a scan task being converted into a string. The scan task string contains all the data elements of a scan task, and is a more compatible data format. Therefore, the task compiler 7 converts a scan task into a scan task string, using the serialization method. The scan task string relating to a scan task is then stored in the hidden field of a web page on the application server 3, or in the "scan task database" on the database server 4, and whereas JAVA classes for the scan tasks are stored in "task services" module 13 on the application server 3, on the server side, and in the task compiler 7 and the task decoder module 10A, on client side.

Below are some exemplary scan task specifications for use with the system development and deployment environment of the present disclosure.

Specification for the AddItem Scan Task

Figure 4A:
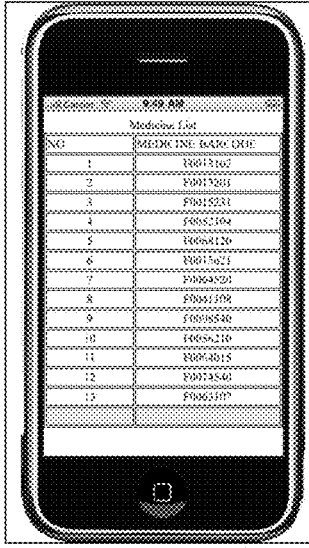
FIG. 4A is a table setting forth the specification for the AddItem scan task, including its Type, Description, Parameter and Script.

In FIG. 4A, Table 1 contains a specification for the AddItem task and describes how to add a new item according to the scanned ID (i.e. scanned bar code symbol character string). The scanned ID will be added into this table as yellow row displays. However, the AddItem task is not limited to adding a row into a table. This task can be easily changed into adding a scanned barcode into a list, or other add item functions.

Specification for the Navigation Scan Task

Figure 4B:
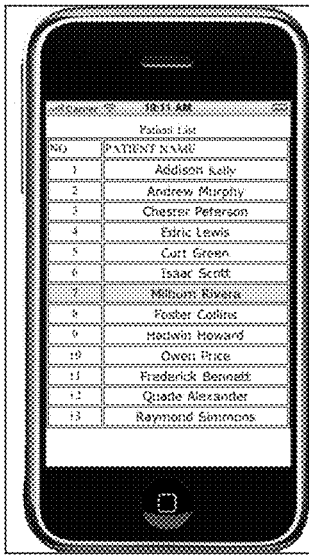
FIG. 4B is a table setting forth the specification for the Navigation scan task, including its Type, Description, Parameter and Script.

In FIG. 4B, Table 2 contains a specification for the Navigation scan task, illustrating that the yellow row will be highlighted when user scans a patient ID (i.e. bar code symbol). Then the browser will be redirected to the detail information, such as name, age, in hospital date and so on of scanned patient.

Specification for the UpdateState Scan Task

Figure 4C:
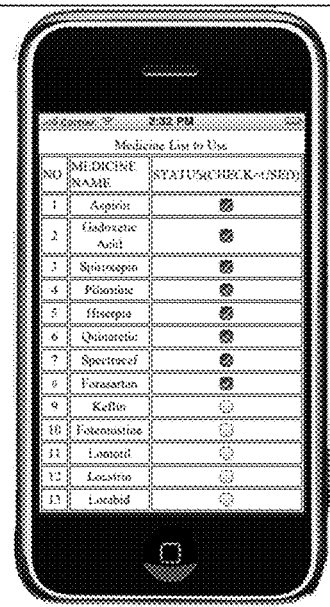
FIG. 4C is a table setting forth the specification for the UpdateState scan task, including its Type, Description, Parameter and Script.

In FIG. 4C, Table 3 provides a specification for the UpdateState scan task which is used to update a web control's state according to scanned ID. For example, the check box or radio button can be checked or unchecked. A switch control can be changed to on/off. All web controls, associated with specific states, can be automatically updated by using this scan task.

Specification for the UpdateContent Scan Task

Figure 4D:
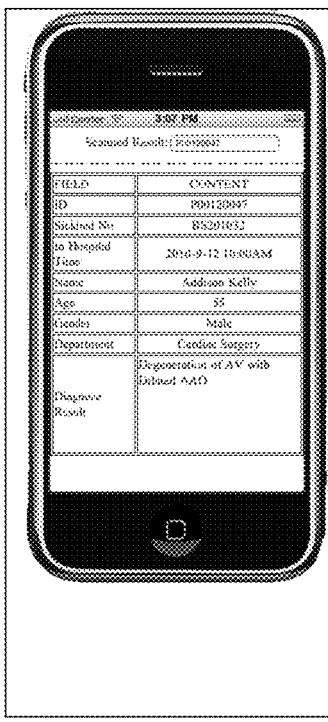
FIG. 4D is a table setting forth the specification for the UpdateContent scan task, including its Type, Description, Parameter and Script.

In FIG. 4D, Table 4 provides a specification for the UpdateContent scan task, and describes how to update controls according to a scanned ID. The Web browser will send an Ajax to server to update its page according to the scanned ID. So the page will be partially refreshed so that it looks like the page is updated by the scan task/action.

Specification for the Composite Task

The above-described scan tasks specified in Tables 1 through 4, shown in FIGS. 3A through 3D, can be viewed as atomic scan tasks, or meta-tasks. Other more complex tasks can be formed, or composited, by assembling the above atomic scan tasks. For example, by assembling the AddItem scan task and the UpdateContent scan task, a new more complex scan task is obtained (i.e. instead of adding the barcode into a table, a medicine name is added into the table). More specifically, the resultant process involves: retrieving the medicine name from the server using the Update Content scan task, and then adding the medicine name into web table using the AddItem scan task.

Once can also assemble the UpdateState scan task and the Navigation_scan task to get a new task. First, the scan engine uses the UpdateState scan task to select one of the medicines (e.g. change the check box status to checked), and then uses the Navigation scan task to navigate to a new web page which shows detail information of the selected medicine (e.g. medicine specification, produced date, and so on). A composite task can be used to combine a certain series of atomic tasks or existing composite tasks, to create more complex tasks to meet the needs of application requirements.

Specification of Web Controls in a Web Page

During system design, "name rules" should be developed for all kinds of "web controls", so as to provide a naming convention for scan task encapsulation during the task preparation phase, and during scan task decoding on a client machine during the deployment phase. In the web-based system of the present disclosures, there are three types of web controls, namely: Textbox, Listbox, and Checkbox. The name rules for these web controls have the following format:

web control ID=web control type+"_"+scanned ID, where the web control type can be "Textbox", "Listbox" and "Checkbox" etc and, in the example given above, where the scanned ID can be patient ID or medicine ID. For example, checkbox for medicine ID, "usedstatus_checkbox_" is as prefix, medicine ID is as postfix.

During system design, a web control such as a checkbox list can be used to indicate whether or not a specific medicine has already been administered to a particular patient. In the event that the checkbox is checked, this would indicate that the medicine "barbiturates" has already been administered to the patient on the scanning date. In a web-based application according to the present disclosure, such a checking event would typically not be invoked by the touch of nurse's finger on the LCD touch-screen surface of the client device 6, but rather the checking operation would be automatically carried out by the web-based scan-task enabled application, in response to the scanning of a barcode identifying "barbiturates". Such features and functionalities will be described in greater detail hereinafter, with respect to system deployment.

Dynamically Created Web Controls in a Web Page Using a Scanned Barcode ID and Name Rules In the application design environment, "name rules" have been designed for all kinds of "web controls".

Figure 12:
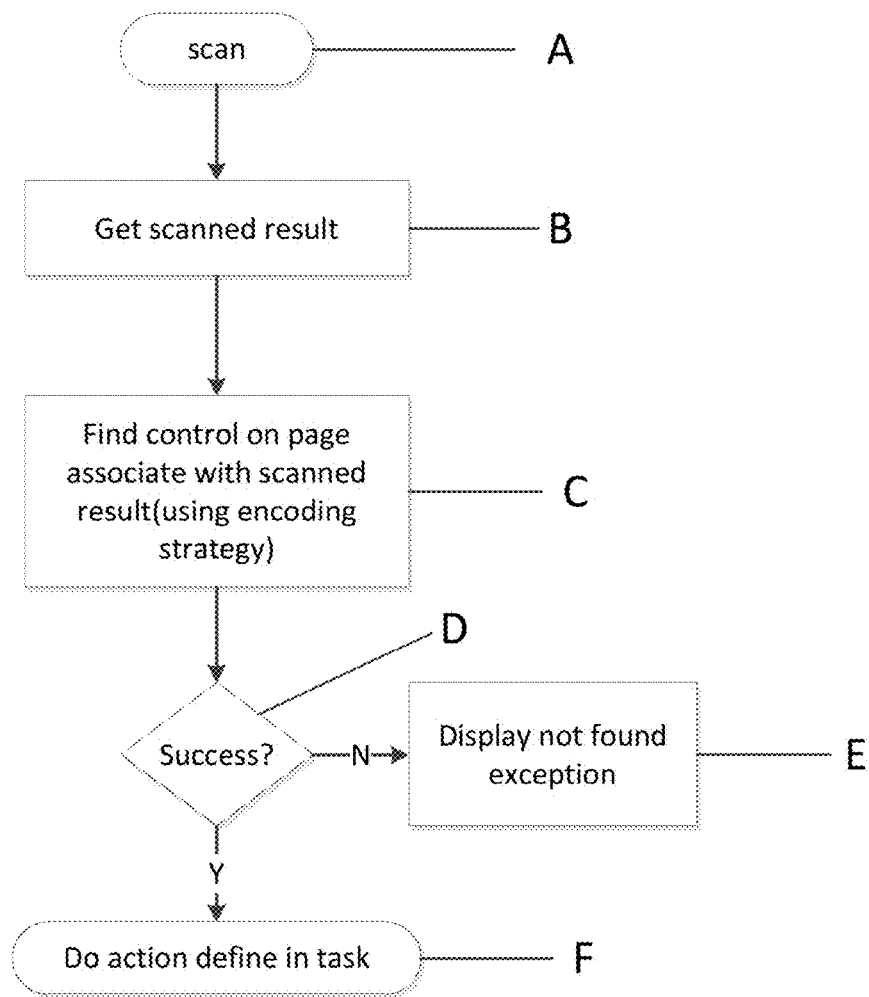
FIG. 12 is a flow chart describing the primary steps undertaken during deployment of the web-based scan-task enabled application, when a scanned ID (ie.g. barcode symbol character string) is automatically associated with web controls on a web page, by way of a dynamic process performed during scan task execution.

When one requests a web page 12, the medicine ID list will be retrieved from application and database servers, and then these web controls will be dynamically created in the web page using the scanned ID (e.g. bar code symbol data or RFID tag data) and the name rule, as illustrated in FIGS. 12 and 13. This way, during systems deployment, or runtime execution when executing a scan task, web controls for the web page can be easily found and accessed by a name rule and a scanned ID, and thereafter, the correct scripted action automatically performed for the displayed web controls.

Mapping Scan Buttons to Scan Tasks in a Web Page

Figure 14:
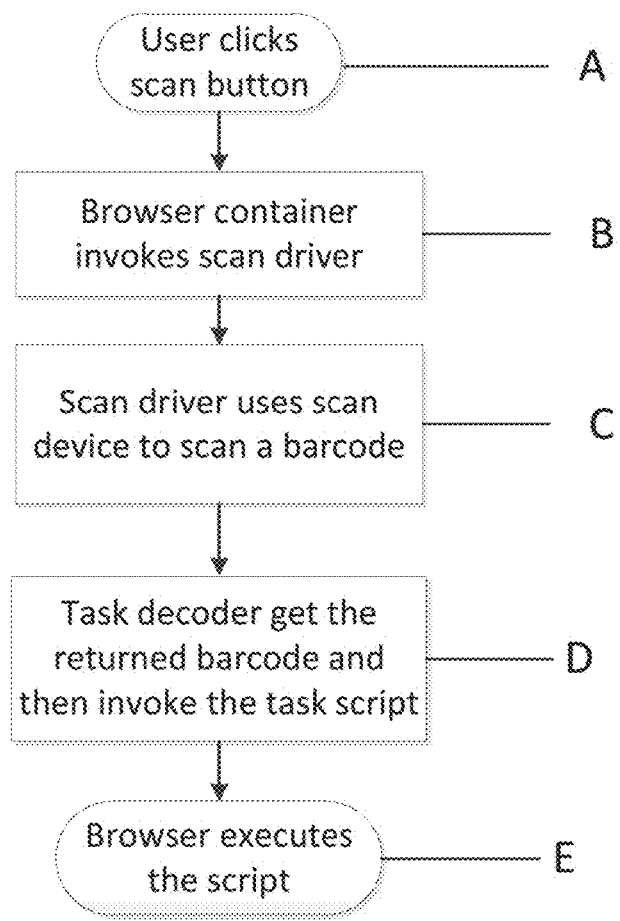
FIG. 14 is flow chart describing the primary steps undertaken during deployment (i.e. run-time) of the web-based scan-task enabled application, when the scan button on a web page is automatically mapped to a specific (decoded) scan task by a dynamic binding process occurring within the client machine, during scan task decoding.

When a web control, such as a scan button, is displayed on a web page, the scan button is automatically mapped to a specific (decoded) scan task by a dynamic binding process occurring within the client system, as illustrated in FIG. 14. This ensures that client can always perform the correct action after scanning a barcode.

During the Systems Development (i.e. Implementation) Phase

As indicated at Block C in FIG. 2A, during the Systems Development (i.e. Implementation) Phase, the designed system is implemented using the implementation technology (e.g. JAVA classes and frameworks, a SQL database, etc) by developers performing the following:

(a) using a task compiler to bind a specific scan task to a specific page; and (b) using the task compiler to encapsulate the scan task into the web page or its application database, to ensure that the web browser will perform the correct scripted activities (i.e. take the correct actions) upon the occurrence of a predefined scanning event, and displayed web controls in the updated web page.

Preparing a Scan Task for Encapsulation on the Server Side

During the task preparation phase, the task compiler 7 will specify all the components of a scan task (type, name, description and script) and then construct a scan task instance. In general, the scan task encapsulation process comprises the following steps:

(1) the JAVA classes are loaded (for all possible scan tasks) into the task service module 13 on the application server 3 on the server side, and also into the task decoder 10A and the task compiler 7 on the client side;

(2) the task compiler 7 constructs an instance for a specific scan task, by taking its integrated scan task class and its user defined data fields (type, name, description and script) as input, and then an instance for a specific scan task can be constructed;

(3) the task compiler 7 serializes the scan task into a scan task string using the serialize method; and (4) the task compiler 7 writes the scan task string into a hidden field in a web page, or in the application server's "scan task database" within the database server 4.

FIG. 5A shows a system and framework for preparing scan tasks on the application server, according to the principles of the present disclosure.

As indicated by arrow 1 in FIG. 5A, during scan task preparation, the task compiler 7 requests a web page list 8B from the task service 13 running on the application server 3.

As indicated at arrow 2 in FIG. 5A, the application responds by sending the requested web page list 8B back to the task compiler 7.

As indicated at arrow 3 in FIG. 5A, during scan task encapsulation, the task compiler 7 submits all possible scan task classes (i.e. its JAVA classes) to the task services 13 on the application server 3.

As indicated at arrow 4 in FIG. 5A, the scan task string (for scan task 8A) is written either (i) into a hidden field in the web page 12 where scan task encapsulation is to occur using the hidden field method (1) of scan task encapsulation described in FIGS. 6 and 7 below, or alternatively, (ii) into the scan task database on database server 4 using either Method 2 (i.e. Cookie Method of Task Encapsulation) described in FIGS. 8 and 9 below, or Method 3 (i.e. Post Method of Task Encapsulation) described below.

Different Possible Methods of Encapsulating a Scan Task on the Server Side

The system developer can edit a scan task 8A compliant with its scan task specification 8D. However, the content of a scan task should not be viewable (i.e. transparent) to an end user via a web browser.

For purposes of illustration, three different methods will be described below for encapsulating a scan task on an application server 3 or its back-end database server 4. The "AddItem" task will be used as an example to describe the different methods of task encapsulation.

The Hidden Field Method of Encapsulation: Where the Scan Task is Stored in a Hidden Web Control in an HTML Page but is not Visible to the End User When using the "hidden field" method, the scan task script is stored in a hidden web control (i.e. interface object field) which is not visible to the end user, but exists in the html page in which the encapsulation occurs, while the scan task specification is integrated on the client 6, the application server 3 and the task compiler 7.

For the task AddItem, the "hidden field" scan task encapsulation method may be follows:

```
<html>
<head>
... ...
</head>
<body>
<input ID="scantask_hiddenfield" type="hidden"
value =
\"$type=\"AddItem\";
$description=\" add the scanned result to a named table as
a new row on current page \";
$parameter=\"controlId='table' \"
$script=" function addItem(scannedID) {
```

```
var table = document.getElementById(controlId);
var rowCount = table.rows.length;
var row = table.insertRow(rowCount-1);
var cell1 = row.insertCell(0);
cell1.align = 'center';
cell1.innerHTML = rowCount - 1;
var cell2 = row.insertCell(1);
cell2.align = 'center';
cell2.innerHTML = scannedID;
}"
/>
... ...
</body>
</html>
```

The Post Method of Encapsulation: Where an HTTP Request is Sent to the Application Server to Get a HTTP Response which Contains the Scan Task When using the "post" method of scan task encapsulation, an http request is sent to the application server to get an http response which contains the "scan task" 8A. The response is an html stream which contains the scan task linked to the current web page, while scan task specification is integrated on the client 6, the application server 3 and the task compiler 7 during system development.

For the AddItem task, the scan task specification may have the form:

```
type="AddItem";
description=" add the scanned result to a named table as a new row on current page ";
parameter="controlId='table'"
script=" function addItem(scannedID) {
    var table = document.getElementById(controlId);
    var rowCount = table.rows.length;
    var row = table.insertRow(rowCount-1);
    var cell1 = row.insertCell(0);
    cell1.align = 'center';
    cell1.innerHTML = rowCount - 1;
    var cell2 = row.insertCell(1);
    cell2.align = 'center';
    cell2.innerHTML = scannedID;
}"
```

The Cookie Method of Encapsulation: Where a Cookie is Created to Save the Scan Task Specification When using the "cookie" method of scan task encapsulation, the Web browser must support cookies, and if so, then a cookie can be created to save a scan task. Preferably, using this method, the scan task is saved as a cookie value using JAVAscript. The cookie name might have the following syntax: a prefix name "taskPage" plus "pagename". A cookie for the scan task may be defined as follows:

```
Cookie name = "taskPageaddItem"
Cookie value = "$type=\"AddItem\"";
$description=\"add the scanned result to a named table as a new row on current page\.";
$parameter=\"controlId='table'\"
$script=\" function addItem(scannedID) {
    var table = document.getElementById(controlId);
    var rowCount = table.rows.length;
    var row = table.insertRow(rowCount-1);
    var cell = row.insertCell(0);
    cell1.align = 'center';
    cell1.innerHTML = rowCount - 1;
    var cell2 = row.insertCell(1);
```

```
    cell2.align = 'center';
    cell2.innerHTML = scannedID;
}\""
```

The scan task specification 8D is integrated on the client computer 6, the application server 3 and the task compiler 7 during system development, regardless of what method of encapsulation is used in a given system implementation.

During the Systems Testing Phase

As indicated at Block D in FIG. 2A, during the Systems Testing Phase, the implemented web-based system is tested and the developers return to the systems development phase and/or systems design phase, as required to build a system that performs the functions specified and required by use case models developed during the systems analysis phase. Typically, test cases will be created based on created use cases, in a manner known in the art.

During the Systems Deployment Phase

As indicated at Block E in FIG. 2B, during the Systems Deployment Phase, the tested implemented system is deployed on a client-server network as shown in FIG. 1A having a web server 2, application server 3 and database server 4. In the deployed system, each mobile scan-task enabled client machine 6 is equipped with a web browser 9A, a browser container 9, a task decoder 10A, and a scan driver 10B supports the following operations:

(a) the web browser 9A requests a web page from the web server driven by the application server and database server, and scanning inputs;

(b) the browser container 9 retrieves and acquires the scan task encapsulated within the web page;

(c) the web browser 9A receives and displays the web page on the display screen of the client machine;

(d) user invokes the scan driver 10B to call code scanner 11 to scan a barcode symbol (or RFID tag) and get code data (i.e. scanned ID), e.g. achieved by the user (i) clicking a scan button on the displayed web page to invoke the scan driver to scan an identification code, (ii) clicking a scan button on a web-enabled client application to invoke the scan driver to scan a code, or (iii) clicking a hard scan button on the mobile client;

(e) the scan driver returns the scanned ID (i.e. code data string) to the Task Decoder 10A (in the browser container);

(f) the task decoder 10A decodes the scan task using the task specification (encapsulated in the webpage) to parse the retrieved web page and decode the scan task, and obtain the scan script contained in the scan task;

(g) the web browser 9A invokes and executes the scan script (e.g JAVAscript or VBScript) while using the scanned ID as a parameter;

(h) while executing the scan script, the web browser 9A determines (i.e. finds) the web controls to be displayed in the web page on the client machine, specified by the decoded scan task script, using the scanned ID as a parameter, and associated name rules for updating current web page, and web control ID matching; and (i) the web browser 9A undertakes the correct action for the displayed web controls.

Methods of Retrieving and Decoding Scan Tasks Encapsulated on the Application Server As indicated above, all scan tasks are encapsulated into web pages 12 residing as objects in the application server 3, or stored as data elements in the database server 4. In order to determine what action needs to be performed for the current "context web page", every webpage 12 owns (i.e. is binded to) a corresponding scan task 8A on the server side. The client machine 6 will get corresponding scan task when web browser navigates to a new page. Using the application server engine on the server side, the client computer always receives the correct scan task and corresponding web pages.

Figure 5B:
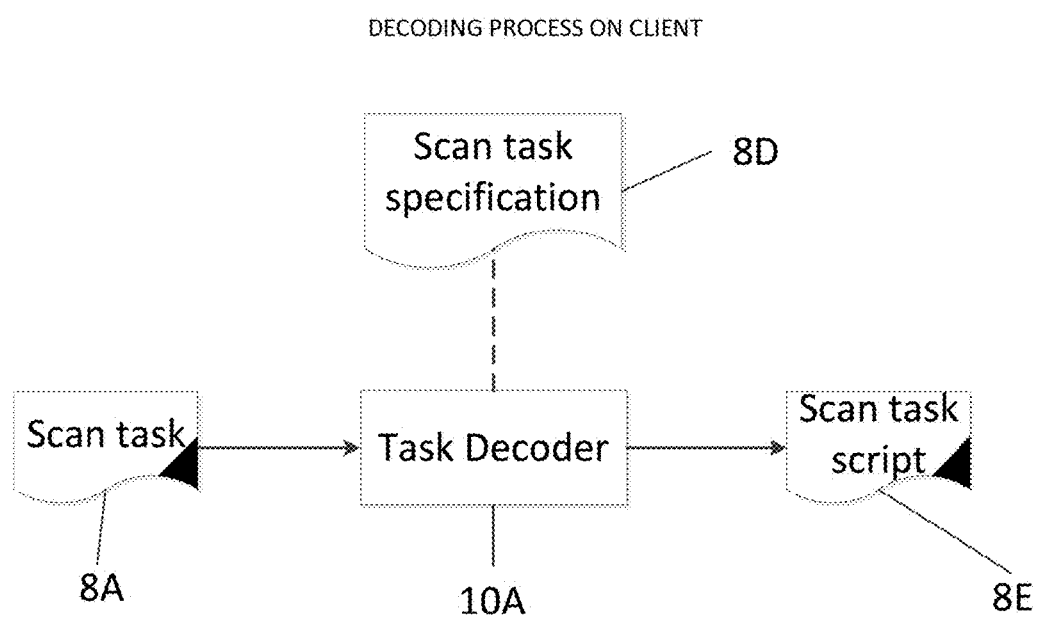
FIG. 5B is a schematic representation illustrating the process that occurs when a scan task is passed to task decoder on a client machine.

As illustrated in FIG. 5B, a scan task decoding process is automatically carried out on the client machine whenever the task decoder 10A obtains a scan task 8A, as input.

In general, when obtaining a scan task as input, the task decoder 10B uses the integrated scan task specification 8D to: (i) successfully decode an implemented scan task 8A according to its scan task specification definition; (ii) separate it into its component parts (i.e. type, description, parameter and scan task script); and (iii) then selects the scan task script 8E from these component parts, for execution by the client web browser 9A.

More specifically, within each client machine in the deployed system, the following scan task decoding process is performed, as follows:

(1) the task decoder 10A within the client machine first gets a scan task string, in response to the web browser 9A receiving a web page from the web server 3;

(2) the task decoder 10A then calls the de-serialize method to de-serialize the scan task string and construct a specific scan task instance;

(3) the task decoder 10A parses the scan task instance to access the scan task script 8E component from the constructed scan task instance;

(4) the task decoder 10A receives code data from the scan driver 10B, in response to a user clicking on the scan button, and then uses the code data as a parameter in the scan task script 8E; and (5) the task decoder 10 provides the scan task script 8E to the web browser 9A for execution, so as to update the web page and its web controls etc.

Three different methods of retrieving and decoding a scan task will be described below for the three different ways of encapsulating a scan task on an application server.

Different Methods of Decoding Scan Tasks Encapsulated by Different Methods

Figure 7:
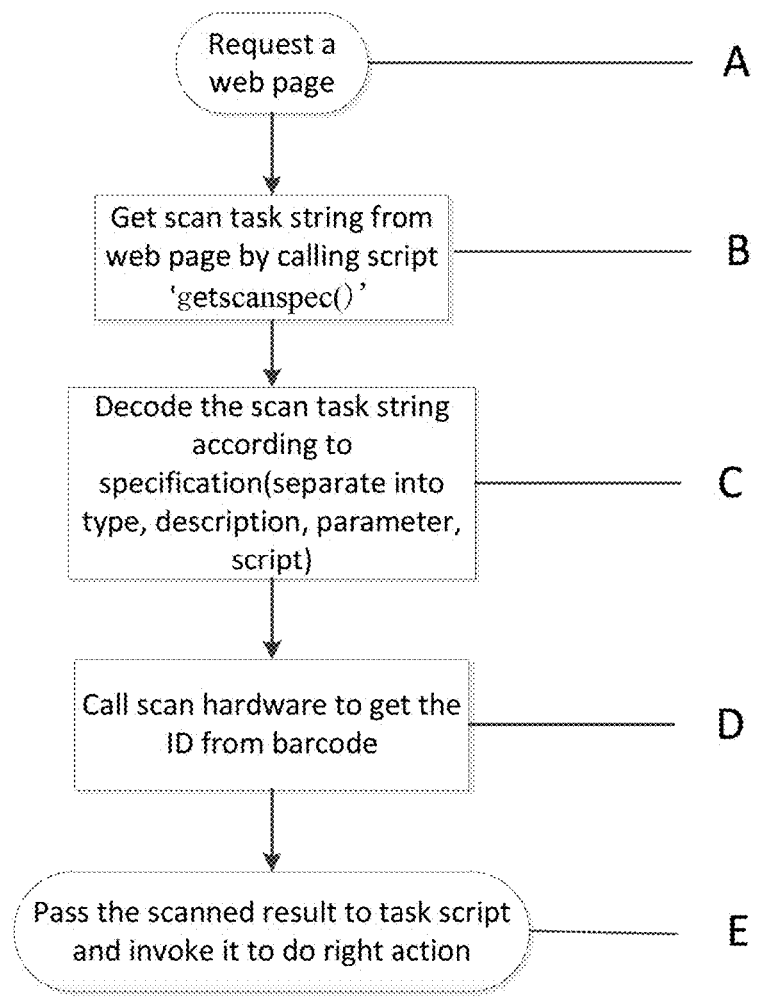
FIG. 7 is a flow chart describing the process of retrieving and decoding scan tasks encapsulated on the server side using the "hidden-field" method of encapsulation, depicted in FIG. 6.
Figure 9:
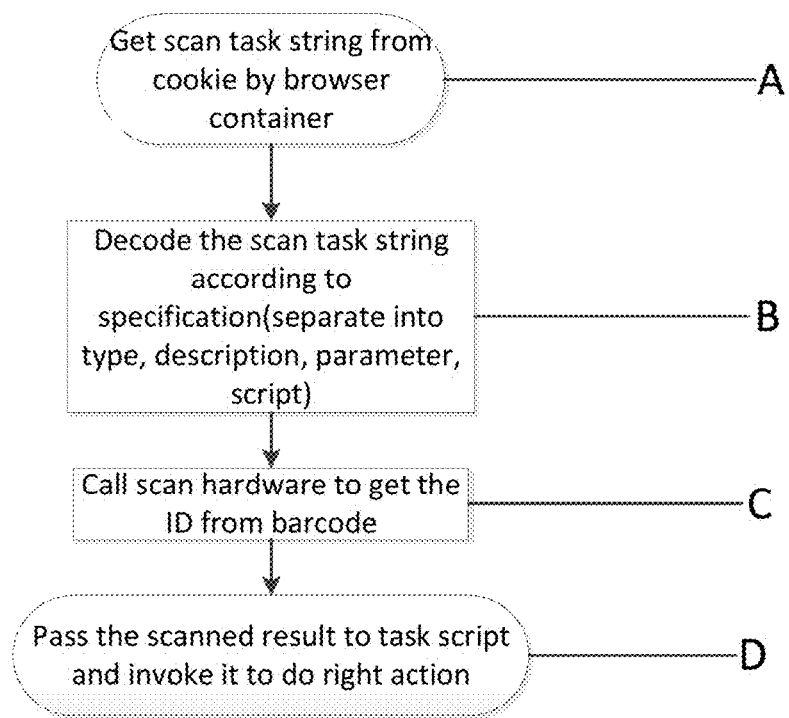
FIG. 9 is a flow chart describing the process of retrieving and decoding scan tasks encapsulated on the server side using the "cookie" method of encapsulation, depicted in FIG. 8.
Figure 11:
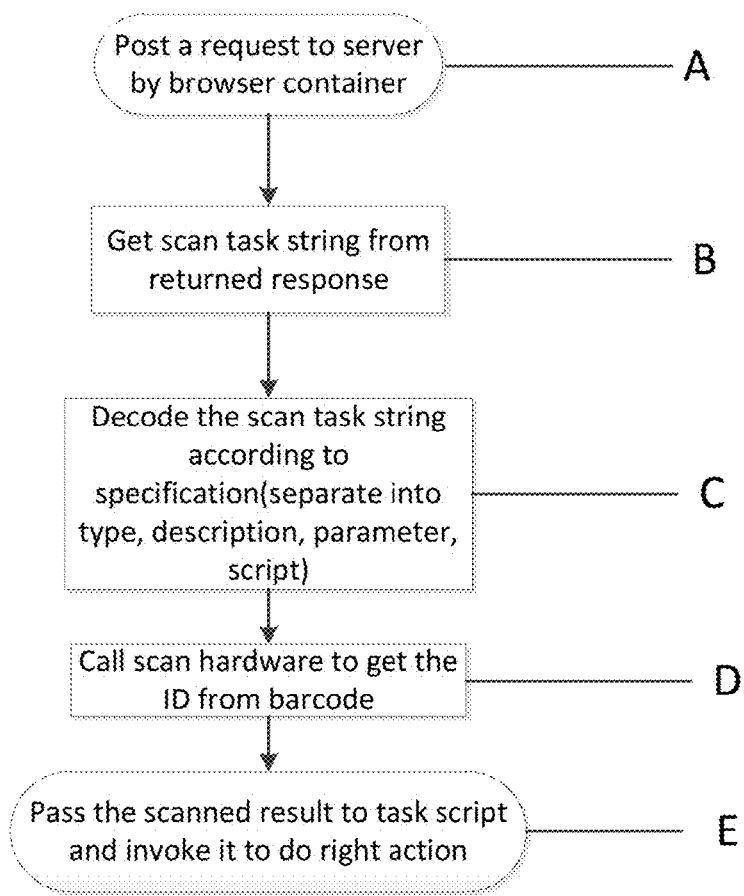
FIG. 11 is a flow chart describing the process of retrieving and decoding scan tasks encapsulated on the server side using the "post" method of encapsulation, depicted in FIG. 10.

As described in FIGS. 7, 9 and 11, there are three different methods of decoding the scan task for each of the above encapsulation methods.

As will be explained in great technical detail hereinafter, when a scan task encapsulated web page is served to and executed on a mobile client system 6, two dynamic processes are automatically carried out in a user-transparent manner, namely: (i) the scanned ID from the client scanner is automatically associated with web controls (i.e. GUI objects) on the web page by a dynamic mapping process described in FIGS. 12 and 13; and (ii) the scan button on the web page is automatically mapped to a specific (decoded) encapsulated scan task by a dynamic process described in FIG. 14.

Method of Retrieving and Decoding Scan Task Encapsulated on the Server Using Hidden Field Method When using the hidden-field method of task encapsulation, the scan task is encapsulated in a hidden field in a web (html) page.

Figure 6:
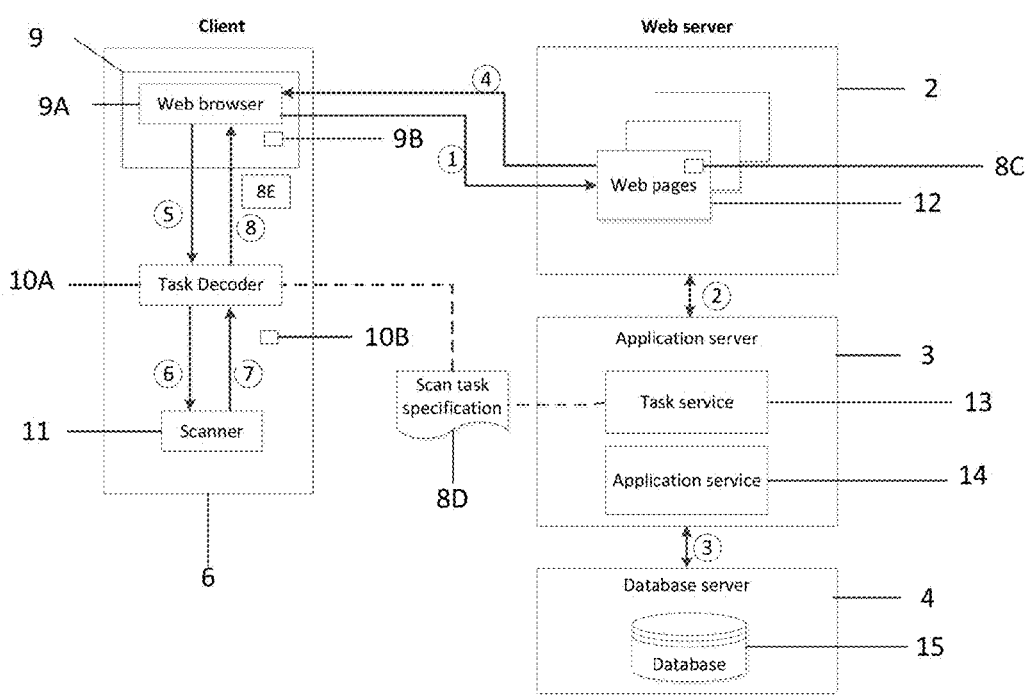
FIG. 6 is a schematic representation of a framework and process for retrieving and decoding scan tasks encapsulated on the server side using the "hidden-field" method of encapsulation, specified in FIG. 7.

As indicated by arrow 1 in FIG. 6, the mobile client system 6 gets the scan task when user navigates to a web page using the web browser. To retrieve the hidden scan task in the web page, the hidden control field thereof is searched using a JAVAscript function function getscanspec( ) such as, for example:

```
function getscanspec( ) {
    var hiddenfield = document.getElementById('scantask_hiddenfield');
    var taskSpec = hiddenfield.value;
    return taskSpec;
```

The above script returns the scan task, which is often described as a "scan task string".

As indicated by arrow 2 in FIG. 6, the Web server calls the task service (and application) service on the application server, and uses application services to get patient and medicine data from the database server.

As indicated by arrow 3 in FIG. 6, the application service gets data from the database server. This data is used to store patient data, medicine data, the scan task and so on in the database server 4. The client will retrieve these data from server's database.

As indicated by arrow 4 in FIG. 6, the web server responds by sending a web page to client's web browser. The web page contains ordinary web controls and a hidden field, which used to store the scan task. Task compiler writes the scan task for each web page, and makes sure all the scan task are correctly encapsulated into server's web page or database server.

As indicated by arrow 5 in FIG. 6, the task decoder gets the scan task in the hidden field, and parses and then decodes the scan task and acquires its scan task script according to the scan task specification. After the scan task has been decoded, the scan button (i.e. web control) on the web page is enabled.

As indicated by arrow 6 in FIG. 6, the task decoder calls the scanner (i.e. scan driver) to scan a barcode for the context at hand.

The step indicated by arrow 6 can be carried out in several possible ways. For example, the web browser, through user interaction with web controls (e.g. displayed scan button) can directly call the scan driver 10B (and thus scanner 6) to scan and read a bar code symbol (i.e. scanned ID). Alternatively, the scan driver can be invoked by a hardware button on the client machine, to scan a bar code symbol.

As indicated by arrow 7 in FIG. 6, the scanner returns a barcode (i.e. scanned ID) to the task decoder.

Finally, as indicated by arrow 8, the task decoder decodes the scan task to obtain the scan task script, and then sets the scanned ID as a parameter in the scan task script, and then invokes the scan task script to be executed on web browser, to update the web page and its web controls.

In the illustrative embodiment, decoding the scan task specification may be achieved using the process shown in FIG. 7.

Process of Decoding Scan Task for Hidden Field Method

As indicated at Block A in FIG. 7, the scan task decoding method involves the web browser on the client machine requesting a web page from the web server.

As indicated at Block B in FIG. 7, the method then involves the web browser getting a scan task string (i.e. concrete scan task) from the web page by calling the script "getscanspec( )" and using the scan task specification integrated on the client.

As indicated at Block C in FIG. 7, the method involves the task decoder decoding the scan task string according to the scan task specification (i.e. separate into type, description, parameter, type).

As indicated at Block D in FIG. 7, the method involves the scan driver the calling the scanning hardware to get the scanned ID from the read bar code symbol.

As indicated at Block E in FIG. 7, the method involves the scanner (i.e. scan driver) passing the scanned result (i.e. scanned ID) as a parameter to the task script, and then the task decoder invoking the task script to perform the right action.

Method of Retrieving and Decoding a Scan Task Encapsulated Using the Cookie Method In general, when using the cookie method of encapsulation, a scan task is encapsulated in cookies stored on the client machine by the application server. The browser container on the client machine can retrieve the cookie using the scan task name. JAVAscript code for getting the scan task from a cookie may take on the following form:

```
function readCookie(tasktype) {
  var nameEQ = tasktype + "=";
  var ca = document.cookie.split(';');
  for (var i = 0; i < ca.length; i++) {
    var c = ca[i];
    while (c.charAt(0) == ' ') c = c.substring(1, c.length);
    if (c.indexOf(nameEQ) == 0) return c.substring(nameEQ.length,
      c.length);
  }
  return null;
}
```

Notably, the parameter 'tasktype' in the function above specifies the Type of scan task described in the task specification, in the illustrative example above.

Figure 8:
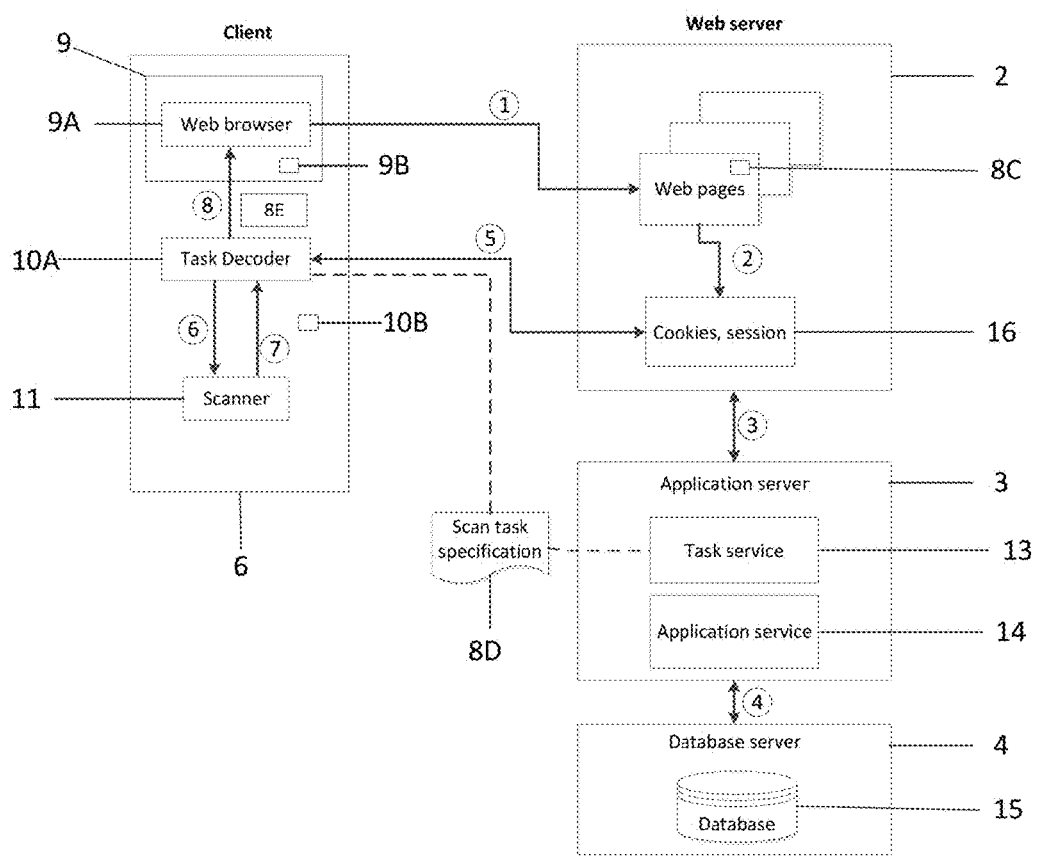
FIG. 8 is a schematic representation of a framework and process for retrieving and decoding scan tasks encapsulated on the server side using the "cookie" method of encapsulation, specified in FIG. 9.

Referring to FIG. 8, a method of initializing cookies and decoding scan tasks will be described.

As indicated by arrow 1 in FIG. 8, the client machine requests a web page from the web server.

As indicated by arrow 2 in FIG. 8, the web server writes scan tasks into cookies.

As indicated by arrow 3 in FIG. 8, the web server calls web service to get the scan task, patient data, medicine data, etc. from the application server.

As indicated by arrow 4 in FIG. 8, the application service on the application server gets the scan task, patient, medicine data from the database server.

As indicated by arrow 5 in FIG. 8, the task decoder on the client machine calls the scan task script (i.e. JAVAscript) from the web server, to get the scan task from the cookies. The task decoder then parses and decodes scan task according to the scan task specification, to generate get retrieve a scan task script. The scan task script is contained in scan task. There is need to generate the scan task script, just retrieve the script from the scan task.

After the scan task has been decoded, the scan button on the web page is enabled.

As indicated by arrow 6 in FIG. 8, the task decoder calls the scanner to scan a barcode symbol.

As indicated by arrow 7 in FIG. 8, the scanner (i.e. scan driver) returns a barcode (i.e. scanned ID) to the task decoder in the client machine.

The step indicated by arrow 7 can be carried out in several possible ways. For example, the web browser, through user interaction with web controls (e.g. displayed scan button) can directly call the scan driver (and thus scanner) to scan and read a bar code symbol (i.e. scanned ID). Alternatively, the scan driver can be invoked by a hardware button on the client machine, to scan a bar code symbol (e.g. patient barcode identification wrist band).

Finally, as indicated by arrow 8, the task decoder decodes the scan task to obtain the scan task script, and then sets the scanned ID as a parameter in the scan task script, and then invokes the scan task script to be executed on web browser, so as to update the web page and its web controls displayed on the display screen of the client machine.

In the illustrative embodiment, decoding the scan task specification may be achieved using the process shown in FIG. 9.

Process for Decoding a Scan Task Encapsulated Using the Cookie Method

As indicated at Block A in FIG. 9, the method involves the browser container in the client machine getting the scan task string using the cookie (i.e. local files) stored on the client machine by the web browser, and accessible by the web browser.

As indicated at Block B, the method involves the task decoder decoding the scan task string according to the scan task specification (i.e. separate into type, description, parameter, script). Scan task are decoded here, and separated into type, description, parameter and script. The purpose of decoding is to get the scan task script. As indicated at Block C, the method involves the scan driver calling the scanning hardware to get the ID from the bar code symbol, read by the scanner.

As indicated at Block D, the method involves the scan driver passing the scanned result (i.e. scanned ID) as a parameter to the scan task script, and then the task decoder invoking the task script so that the web browser will perform the specified scripted action.

Method of Retrieving and Decoding a Scan Task Encapsulated on the Server Using the Post Method In general, when using the post method of encapsulation, an http request is send (posted) to server to get an http response containing the scan task.

Figure 10:
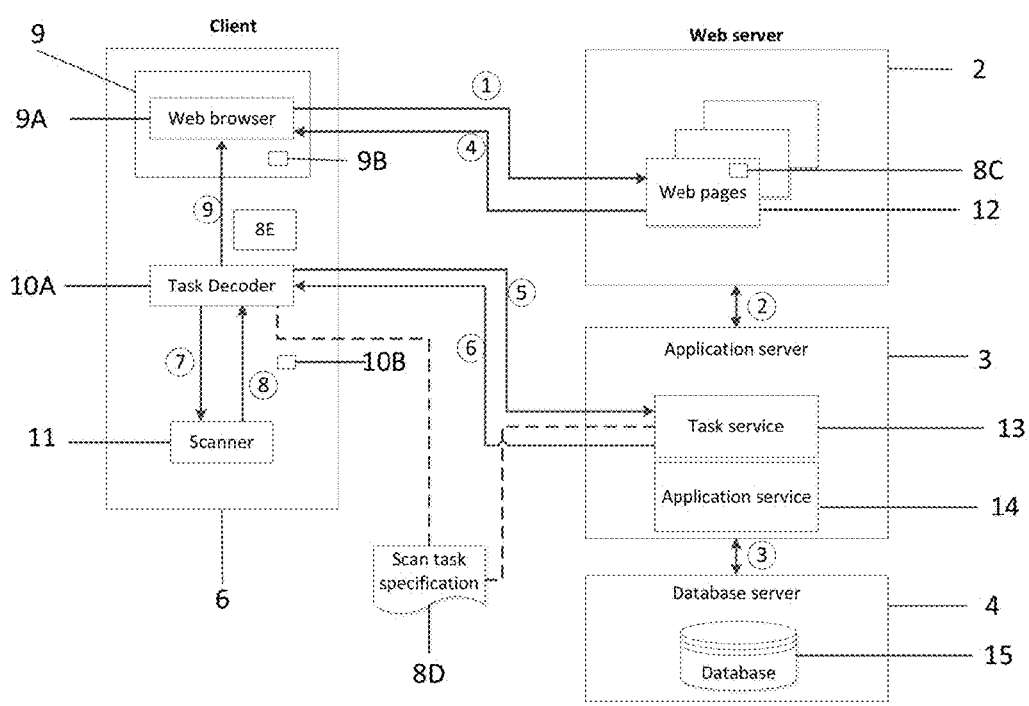
FIG. 10 is a schematic representation of a framework and process for retrieving and decoding scan tasks encapsulated on the server side using the "post" method of encapsulation, specified in FIG. 11.

As indicated by arrow 1 in FIG. 10, the client requests web page from the application server.

As indicated by arrow 2 in FIG. 10, the web server calls the application server (i.e. task service) to get patient, medicine data, etc from the database server.

As indicated by arrow 3 in FIG. 10, the application service gets patient, medicine data from database server.

As indicated by arrow 4 in FIG. 10, the web server responds by sending a web page to client's web browser.

As indicated by arrow 5 in FIG. 10, the task decoder (on the client machine) post a request (call a JAVAscript, it is not the scan task script but just a common method used in web development) to get the scan task from web services on application server.

As indicated by arrow 6 in FIG. 10, the application server returns a scan task to the web browser, and then the task decoder gets the scan task from the client web browser. The task decoder parses and decodes scan task according to the scan task specification. A scan task will be separated into type, description, parameter and scan task script 8E after decoding. After the scan task has been decoded, the scan button on the web page is enabled.

As indicated by arrow 7, the scan driver is called to invoke the bar code scanner (in the client machine) to scan a barcode symbol (e.g. an identification barcode), and then return the scanned barcode ID to the web browser.

The step indicated by arrow 7 can be carried out in several possible ways. For example, the web browser, through user interaction with web controls (e.g. displayed scan button) can directly call the scan driver (and thus scanner) to scan and read a bar code symbol (i.e. scanned ID). Alternatively, the scan driver can be invoked by a hardware button on the client machine, to scan a bar code symbol.

As indicated by arrow 8, the scanner (i.e. scan driver) returns barcode symbol character data (i.e. scanned ID) to the task decoder.

Finally, as indicated by arrow 9, the task decoder sets the scanned ID as a parameter in the scan task script 8E, and then invokes the scan task script to be executed on web browser.

In the illustrative embodiment, decoding the scan task specification may be achieved using the process shown in FIG. 11.

Decoding the Scan Task when Encapsulated According to the Post Method

As indicated at Block A in FIG. 11, the post decoding method involves the web browser container posting an http request to server.

As indicated at Block B, the method involves the server returning an http response to the client machine, and the web browser getting the scan task string (i.e. describing the scan task specification) from the returned http response.

As indicated at Block C, the method involves the task decoder decoding the scan task string according to the scan task specification (i.e. separate into type, description, parameter, and script), and then the scan task script can be obtained after decoding.

As indicated at Block D, the method involves the scan driver calling the scanning hardware to get the scanned ID from the read bar code symbol.

As indicated at Block E, the method involves the scan driver passing the scanned result (i.e. scanned ID) as a parameter to the scan task script, and the task decoder invoking the scan task script so that the web browser will perform the scripted action.

The Scanned ID is Automatically Associated with Web Controls (i.e. GUI Objects) by a Dynamic Mapping Process when a Scan Task Encapsulated Web Page is Executed on a Client System While the web browser does not have to find web controls when navigating to a new web page, it does have to automatically find web controls from a scanned ID when updating its web page in response to reading a bar code symbol, as illustrated in FIGS. 12 and 13. In the system of the present disclosure, web control functions associated with a scanned barcode ID are created in a web page dynamically, using a web page encoding strategy. Name rules have been developed for all kinds of web controls. Also, the web pages generated on the application server are encoded so that a specific scan task can be binded to a specific web page. All web controls in each page are well tagged. Also, the web control's ID is named using a predefined format. Using such an encoding strategy, the web controls for any web page in an application can be found from the scanned ID by a process called "mapping" shown in FIG. 12.

For example, a checkbox for a medicine ID, "usedstatus_checkbox_" is used as a prefix, whereas a medicine ID is used as a postfix. When a web page is requested, the medicine ID list will be retrieved from the application server, and then these web controls will be dynamically created in the web page using the barcode ID and name rules. Thus, when executing a scan task, the web controls for the web page can be easily found and accessed by a name rule and scan ID, and then the correct action performed for the web control Referring to FIG. 12, the process of mapping from a scanned ID to a web control is described.

As indicated at Block A in FIG. 12, the mapping process involves scanning the bar code symbol involved in the scan-task powered application deployed in the Web-based system of the present disclosure.

As indicated at Block B in FIG. 12, the process involves getting the scanned results (i.e. bar code ID).

As indicated at Block C in FIG. 12, the process involves finding controls on the web page associated with the scanned result (e.g. using the encoding strategy).

As indicated at Block D in FIG. 12, the process determines whether or not it has been successful, and if so, then at Block E, the process involves doing the action defined in the decoded scan task; and if not, then at Block F, the process involves displaying the "not found" exception.

As shown in FIG. 13, the web control IDs for all check boxes are listed in "Name to ID mapping" table set forth therein. The web control ID is named with a prefix "usedstatus_checkbox" where the term "usedstatus" means, in the illustrative application, the field specification for indicating whether the medicine is used today and the term "checkbox" means the type of web control. Moreover each web control ID name ends with a medicine ID "AS001020" which means that the medicine is Aspirin001020. So the Web browser can search the web control's ID "usedstatus_checkbox_AS001020" from the web page if the user scanned a barcode "AS001020". If the web control is found, then it is automatically marked with a check mark without the user having to perform manual data entry operations.

Automatic Mapping of Scan Button is to Specific Decoded Scan Task During Scan Task Decoding on a Client System FIG. 14 describes the primary steps undertaken during deployment (i.e. run-time) of the web-based scan-task enabled application, when the scan button on a web page is automatically mapped to a specific (decoded) scan task by a dynamic binding process occurring within the client machine, during scan task decoding.

The scan button is the UI for invoking a scan task on client side. The preferred method of automatically mapping a scan button to a specific task is based on the concept that the correct action can always be achieved by the client whenever the user clicks a scan button.

As indicated at Block A in FIG. 14, the process begins by the user clicking the scan button (i.e. a web control) on the web page, or alternatively, clicking on the client machine in the case that a hard scan button is supported on the client machine.

As indicated at Block B in FIG. 14, the browser container invokes the scan driver within the client machine.

As indicated at Block C in FIG. 14, the scan driver within the client machine uses its integrated bar code scanner to scan a bar code and generate symbol character data representative thereof.

As indicated at Block D in FIG. 14, the task decoder acquires the returned bar code symbol data (i.e. scanned ID), and then invoke the task script.

As indicated at Block E in FIG. 14, the web browser executes the task script.

Benefits of the System and Methods of the Present Disclosure

By virtue of the above innovations, the web-based scan-task enabled application is provided with information (i.e. supporting an awareness capacity) at the time of development as to what action to take on a particular web page (e.g., scan a bar code symbol on a medicine, about to be administered, so as to display a web page listing all medicines prescribed to the patient by the patient's doctors). This process is referred to as "context-aware" because the web-based scan-task enabled application running on the mobile client machine has embedded knowledge on how to automatically respond to a particular scanning event, by way of the instructions (i.e. scan response action) embodied within the scan task, encapsulated in the web page where the scanning event is performed (i.e. embodied within the context of where the scanning event is to be performed on the web).

Unlike traditional methods characterized by hard-coding each scanning event in a web page, the method of the present disclosure involves designing scan task scripts and using a task compiler to encapsulate these scan task scripts within an html (i.e. web) page, or on a server, without changing the code in the web page, thereby allowing each served web page to be parsed on the client machine during run-time deployment sessions, and its scan task script accessed and executed to perform the action (i.e. including display of web controls) specified by the scan task script. It makes the system more flexible and developer can extent the scan tasks (add, remove or update) at any time.

From the end user's perspective, whenever he clicks a particular scan button (i.e. web control) on a particular web page displayed within the web browser of the client machine, the underlying process linked to the scan button is handled as specified in the scan task script embedded within the web page, or loaded on the application server. For example, in a hospital, when user scans patient ID, the patient's detail information can be listed in the sickroom. However, when in a transfusion room, after the patient ID is scanned, all medicines assigned to the patient by a doctor can be listed for review on the LCD screen of the mobile client device, by the doctor. Such context-dependent scanning provides a new level of flexibility unachievable using conventional methods. By virtue of the scan tasks encapsulation methods disclosed herein, the development and deployment environment of the present disclosure can be used to build systems capable of supporting multiple complex scan tasks, no longer limited to executing a single scan task as characterized by conventional systems supporting only a single scan task (e.g. when scanning a barcode symbol on a product in supermarket).

In the application development environment, a checkbox list can be used to indicate whether or not a medicine has already been taken by a patient. In the event that the checkbox is checked, this would indicate that the medicine "barbiturates" has already been administered to a patient today. Note that the checking event on the web page is not invoked by the nurse's finger touch, but automatically by the web-based application in response to scanning a medicine identification barcode identifying "barbiturates".

Applications for Development and Deployment Environment of the Present Disclosure The web-based application development and deployment methods and apparatus of the present disclosure can be applied in diverse scan task environments. For example, these tools, techniques, systems and devices can be applied to a web-based application involving the scanning of diverse kinds of user identification barcodes and object identification barcodes within a given enterprise, and then viewing detailed information about the users and objects within the enterprise. In addition to supporting the scanning of barcode symbols, these development and deployment techniques can be used to perform a prescribed action in response to bar code scanning (e.g. checking a checkbox or navigating to a new page) intended by the developers of the application.

Modifications that Come to Mind

The present disclosure teaches various ways of and means for defining scan tasks, encapsulating scan tasks in web pages, and decoding and executing the same in ways which no longer requires hard coding of scan task events. While a number of different techniques have been presented for practicing such techniques in a client-server network environment. It is understood that other techniques can be used to practice the novel concepts and principles of the present disclosure.

Variations and modifications to this such apparatus and processes will readily occur to those skilled in the art having the benefit of the present disclosure. All such modifications and variations are deemed to be within the scope of the accompanying Claims.

The invention claimed is:

1. A method of deploying a web-based scan-task enabled application comprising the steps of:
  (a) providing a scan task specification to a client machine on a client side comprising a display surface, a scanner, a scanner driver, a web browser, and a task decoder, wherein said scan task specification includes definitional components for type, description, parameter and scan task script, and corresponds to a scan task encapsulated on at least one of an application server or a web server, the scan task embodying a context-aware scripted scan response action to be performed as specified by the scan task script;
  (b) providing said scan task specification to said application server, wherein the application server is communicatively coupled to said web server serving to said web browser a web page associated with said scan task encapsulated on any of the application server and/or the web server;
  (c) said client machine using said task decoder and said scan task specification to decode said scan task, corresponding to said webpage, and parse said scan task into its component parts including type, description, parameter, and scan task script; and
  (d) selecting said scan task script from said component parts for execution by said web browser to perform said context-aware scripted scan response action specified by said selected scan task script, the context-aware scripted scan response action comprising displaying web controls embedded in said web page and linked to said scan task, the decoding of said scan task and execution of said scan task script is in response to scanning a code on the client side.

2. The method of claim 1, further comprising: (e) displaying said web page, including said web controls, on the display surface of said client machine.

3. The method of claim 1, wherein the client machine comprises a browser container operable to be executed as a native application on the client machine and wherein the browser container provides a user interface for an operator by integrating the task decoder, the scan driver, and the web browser on the client machine.

4. The method of claim 1, wherein providing the scan task comprises serializing the scan task into scan task strings before encapsulating the scan task on any of the application server or the web server.

5. The method of claim 1, wherein decoding the scan task comprises de-serializing the scan task by parsing the scan task into a scan task instance.

6. The method of claim 1, wherein said client machine is provided with a hard scan button, and wherein said method comprises:
  (f) a user selecting said hard scan button on said client machine;
  (g) said scanner scanning the code and automatically generating code data representative of said read code;

(h) said scan driver providing said code data to said task decoder;

(i) said task decoder setting said code data as a parameter in said selected scan task script; and (j) said web browser executing said scan task script and automatically updating said web page and any web controls linked to said web page.

7. The method of claim 1, wherein said web controls include a scan button displayed on said display surface of said client machine, and wherein said method comprises:

(f) a user selecting said scan button displayed on the display surface of said client machine;

(g) said scanner scanning the code and automatically generating code data representative of said read code;

(h) said scan driver providing said code data to said task decoder;

(i) said task decoder setting said code data as a parameter in said selected scan task script; and (j) said web browser executing said scan task script and automatically updating said web page and any web controls linked to said web page.

8. A deployment environment for deploying a web-based scan-task enabled application, the deployment environment comprising:

a client side having at least one client machine, wherein each said client machine includes a display surface, a code scanner, a scan driver, a web browser, and a task decoder;

a server side having a web server, an application server supporting said web server, and a database server supporting said application server;

a scan task specification provided on each said client machine, wherein said scan task specification includes definitional components for type, description, parameter, and scan task script, and defines a scan task encapsulated on said server side, the scan task embodying a context-aware scripted scan response action to be performed as specified by the scan task script;

said scan task specification provided on said server side for use by said application server;

wherein said web server serves a web page to said web browser of at least one said client machine;

wherein said web page is associated with said scan task encapsulated on said server side;

wherein, in response to scanning a code on the client side, said client machine uses said task decoder and said scan task specification to decode said scan task, associated with said webpage, and parse said scan task into its component parts including type, description, parameter and scan task script;

wherein said task decoder selects said scan task script from said component parts, for execution by said web browser, to perform said context-aware scripted scan response action specified by said selected scan task script, the context-aware scripted scan response action comprising displaying web controls embedded in said web page and linked to said scan task; and wherein said web browser displays said web page, including said web controls, on the display surface of said client machine.

9. The deployment environment of claim 8, wherein the at least one client machine comprises a browser container operable to be executed as a native application on the client machine and wherein the browser container provides a user interface for an operator by integrating the task decoder, the scan driver, and the web browser on the client machine.

10. The deployment environment of claim 8, wherein said client machine is provided with a hard scan button, and wherein when a user of said client machine selects said scan button, the following operations automatically occur:

(i) said scanner scans the code and automatically generates code data representative of said read code;

(ii) said scan driver provides said code data to said task decoder;

(iii) said task decoder sets said symbol character data as a parameter in said selected scan task script; and (iv) said web browser executes said scan task script and automatically updates said web page and any web controls linked to said web page.

11. The deployment environment of claim 10, wherein the scan button is mapped to the scan task encapsulated in the web page based on a dynamic binding of the scan task on the client machine while decoding the scan task.

12. The deployment environment of claim 8, wherein said web controls include a scan button displayed on said display surface of said client machine, and wherein when a user of said client machine selects said scan button, the following operations automatically occur:

(i) said scanner scans the code and automatically generates code data representative of said read code;

(ii) said scan driver provides said code data to said task decoder;

(iii) said task decoder sets said symbol character data as a parameter in said selected scan task script; and (iv) said web browser executes said scan task script and automatically updates said web page and any web controls linked to said web page.

13. The deployment environment of claim 12, wherein the scan button is mapped to the scan task encapsulated in the web page based on a dynamic binding of the scan task on the client machine while decoding the scan task.

14. The deployment environment of claim 8, wherein said scan task is encapsulated on said server side, by writing said scan task into a hidden field within said web page.

15. The deployment environment of claim 8, wherein said scan task is encapsulated on said server side, by storing said scan task in a cookie stored in the web browser of said client machine.

16. The deployment environment of claim 8, wherein said scan task is encapsulated on said server side, by storing said scan task within said database server.

17. The deployment environment of claim 8, wherein each said client machine is selected from the group consisting of mobile code symbol reading smart phones, web-enabled optical code scanner driven device, and portable computing systems having an integrated bar code symbol reading engine, and/or RFID tag reading engine.

18. A method, comprising:

(a) providing on a client device a web browser, a code scanner, a task decoder, and a scan task specification;

(b) serving a web page associated with a scan task on the web browser from a web server, wherein the scan task has been encapsulated on an application server coupled to the web server, the scan task embodying a context-aware scripted scan response action to be performed as specified by a corresponding scan task script;

(c) retrieving the scan task specification by the task decoder and decoding the scan task;

(d) obtaining the scan task script from the decoded scan task;

and in response to scanning a code on the client side, (e) generating code data representative of the scanned code by the scanner;

(f) setting said code data as a parameter in said scan task script; and
(g) executing the scan task script to perform the context-aware scripted scan response action specified in the scan task script, wherein the context-aware scripted scan response action includes the display of web controls and updating the web page and any web controls linked thereto.

19. The method of claim 18, wherein the scan task is a composite scan task formed by assembling two or more atomic scan tasks.

20. The method of claim 18, wherein decoding the scan task comprises de-serializing the scan task by parsing the scan task into a scan task instance.

* * * * *